(12) United States Patent
Liu

(10) Patent No.: US 6,963,564 B1
(45) Date of Patent: Nov. 8, 2005

(54) METHOD AND APPARATUS FOR SYNCHRONIZED SLOTTED OPTICAL BURST SWITCHING

(75) Inventor: Heyun H. Liu, Plano, TX (US)

(73) Assignee: Alcatel, Paris (FR)

( * ) Notice: Subject to any disclaimer, the term of this patent is extended or adjusted under 35 U.S.C. 154(b) by 805 days.

(21) Appl. No.: 09/795,373

(22) Filed: Feb. 26, 2001

Related U.S. Application Data

(60) Provisional application No. 60/257,825, filed on Dec. 22, 2000.

(51) Int. Cl.[7] .............. H04L 12/28; H04L 12/43; H04J 4/00

(52) U.S. Cl. .......... 370/389; 370/395.4; 370/436; 370/460; 398/98

(58) Field of Search .............. 370/389, 392, 370/395.4, 431, 436, 438, 458–460; 398/43, 398/45–50, 55–56, 74–75, 98, 99, 101, 102

(56) References Cited

U.S. PATENT DOCUMENTS

| | | | | |
|---|---|---|---|---|
| 5,416,769 | A | * | 5/1995 | Karol .......... 370/414 |
| 5,734,486 | A | * | 3/1998 | Guillemot et al. .......... 398/54 |
| 6,011,798 | A | * | 1/2000 | McAlpine .......... 370/395.42 |
| 6,034,960 | A | * | 3/2000 | Beshai et al. .......... 370/395.4 |
| 6,118,762 | A | * | 9/2000 | Nomura et al. .......... 370/230 |
| 6,208,661 | B1 | * | 3/2001 | Marshall .......... 370/412 |
| 6,466,343 | B1 | * | 10/2002 | Lahat et al. .......... 398/82 |
| 6,728,212 | B1 | * | 4/2004 | Tancevski .......... 370/235 |

OTHER PUBLICATIONS

Xiong, et al, "Control Architecture in Optical Burst-Switched WDM Networks", Oct. 2000, IEEE Journal on Selected Areas in Communications, vol. 18, No. 10, pp 1838-1851.*

Turner, Jonathan S., "Terabit Burst Switching", Dec. 18, 1997, WUCS-97-49, Washington University, pp. 1-36.*

Chen, Yuhua, et al, "WDM Burst Switching for Petabit Capacity Routers", Oct. 31, 1999, IEEE MILCOM 1999, vol. 2, pp. 968-973.*

Battestilli, et al, "An Introduction to Optical Burst Switching", Aug. 2003, IEEE Optical Communications, pp. S10-S15.*

Blumenthal, et al, "Photonic Packet Switches: Architectures and Experimental Implementations", Nov. 1994, Proceedings of the IEEE, vol. 82, No. 11, pp. 1650-1667.*

* cited by examiner

*Primary Examiner*—Seema S. Rao
*Assistant Examiner*—Robert C. Scheibel, Jr.
(74) *Attorney, Agent, or Firm*—Anderson, Levine & Lintel; Jessica W. Smith; W. Lawrence Sewell

(57) ABSTRACT

A network (4) includes optical routers (19), which route information in fibers (10). Each fiber carries a plurality of data channels (16), carrying data in data bursts (28) and a control channel, carrying control information in burst header packets (32). A burst header packet includes routing information for an associated data burst (28) and precedes its associated data burst. Information on the data channels and control channel is organized in synchronized slots. Multiple burst header packets occupy portions of a slot, referred to as micro-slots. When the burst header packets are received, an egress processor (52) schedules the routing of their associated bursts. The egress processor (52) determines a time at which a data burst can be scheduled for passing through an optical matrix (40) to the desired output channel group (the burst can be delayed via fiber delay lines (46) if necessary).

24 Claims, 14 Drawing Sheets

METHOD AND APPARATUS FOR SYNCHRONIZED SLOTTED OPTICAL BURST SWITCHING

CROSS-REFERENCE TO RELATED APPLICATIONS

This application claims the benefit of the filing date of copending provisional application U.S. Ser. No. 60/257,825, filed Dec. 22, 2000, entitled "Method and Apparatus for Synchronized Slotted Optical Burst Switching" to Liu.

This application is related to U.S. Ser. No. 09/569,488 filed May 11, 2000, now U.S. Pat. No. 6,819,970, entitled, "All-Optical Networking Optical Fiber Line Delay Buffering Apparatus and Method", which claims the benefit of U.S. Ser. No. 60/163,217 filed Nov. 2, 1999, entitled, "All-Optical Networking Optical Fiber Line Delay Buffering Apparatus and Method" and is hereby fully incorporated by reference. This application is also related to U.S. Ser. No. 09/409,573 filed Sep. 30, 1999, now U.S. Pat. No. 6,721,315, entitled, Control Architecture in Optical Burst-Switched Networks" and is hereby incorporated by reference. This application is further related to U.S. Ser. No. 09/689,584, filed Oct. 12, 2000, now U.S. Pat. No. 6,804,255, entitled "Hardware Implementation of Channel Scheduling Algorithms For Optical Routers With FDL Buffers," which is also incorporated by reference herein.

This application is further related to U.S. Ser. No. 09/795,375, filed concurrently herewith, entitled "Discrete Time Sequence Model for Slotted and Synchronous Switching of Optical Burst Signals" to Liu, U.S. Ser. No. 09/795,382, filed concurrently herewith, entitled "Protocol Architecture for Transmitting IP Traffic Over a Slotted OBS Network" to Liu, and U.S. Ser. No. 09/795,374, filed concurrently herewith, entitled "Method and Apparatus for Transmitting Over a Slotted OBS Network in In-Band Mode" to Liu.

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to a method and apparatus for optical switching.

2. Description of the Related Art

Data traffic over networks, particularly the Internet, has increased dramatically recently, and will continue as the user increase and new services requiring more bandwidth are introduced. The increase in Internet traffic requires a network with high capacity routers capable of routing data packets of variable length. One option is the use of optical networks.

The emergence of dense-wavelength division multiplexing (DWDM) technology has improved the bandwidth problem by increasing the capacity of an optical fiber. However, the increased capacity creates a serious mismatch with current electronic switching technologies that are capable of switching data rates up to a few gigabits per second, as opposed to the multiple terabit per second capability of DWDM. While emerging ATM switches and IP routers can be used to switch data using the individual channels within a fiber, typically at 2.4 gigabits per second or ten gigabits per second, this approach implies that tens or hundreds of switch interfaces must be used to terminate a single DWDM fiber with a large number of channels. This could lead to a significant loss of statistical multiplexing efficiency when the parallel channels are used simply as a collection of independent links, rather than as a shared resource.

Different approaches advocating the use of optical technology in place of electronics in switching systems have been proposed; however, the limitations of optical component technology has largely limited optical switching to facility management/control applications. One approach, called optical burst-switched networking, attempts to make the best use of optical and electronic switching technologies. The electronics provides dynamic control of system resources by assigning individual user data bursts to channels of a DWDM fiber, while optical technology is used to switch the user data channels entirely in the optical domain.

Previous optical burst-switched networks designed to directly handle end-to-end user data channels have been disappointing and have shown the limitations of current optical components.

Therefore, a need has arisen for a method and apparatus for providing a burst-switched network.

BRIEF SUMMARY OF THE INVENTION

In the present invention, a method and apparatus for scheduling the switching of data burst through a router in an optical burst switched network is shown, wherein data bursts are received by the router over a first set of plurality of optical transmission lines and are switched to a second set of optical transmission lines. The data bursts are communicated over the first and second sets of optical transmission lines over multiple channels using synchronous fixed length slots, each burst occupying one or more slots in a channel. Current scheduling bit patterns are generated for respective outgoing channels indicating which slots in each outgoing channel are already scheduled to transmit a data burst within a predetermined time window relative to a current time point. An incoming burst bit sequence is generated for an incoming burst indicating which slots within the predetermined time window would be occupied by the incoming burst relative to a current time point. The incoming burst bit sequence is compared with the current scheduling bit patterns to determine whether the incoming burst can be scheduled for transmission on one of the outgoing channels.

The present invention provides an efficient and flexible architecture for switching data bursts.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–33 of the drawings, like numerals being used for like elements of the various drawings.

Figure 1:
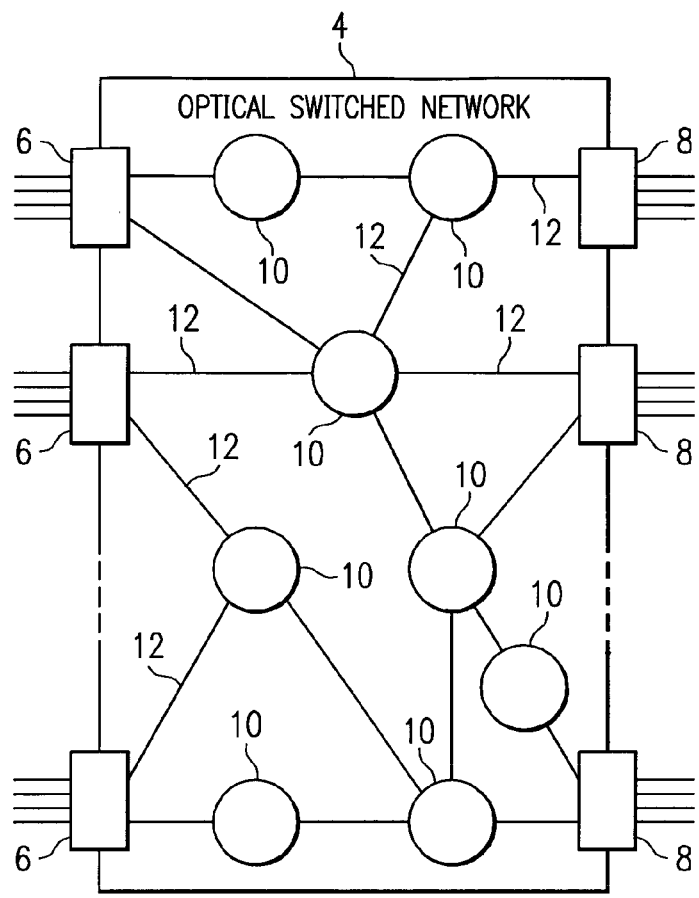
FIG. 1 is a block diagram of an optical network.

FIG. 1 illustrates a general block diagram of an optical switched network 4. The optical switched network 4 includes multiple electronic ingress edge routers 6 and multiple egress edge routers 8. The ingress edge routers 6 and egress edge routers 8 are coupled to multiple core routers 10. The connections between ingress edge routers 6, egress edge routers 8 and core routers 10 are made using optical links 12. Each optical fiber can carry multiple channels of optical data.

In operation, a data burst (or simply "burst") of optical data is the basic data block to be transferred through the network 4. Ingress edge routers and egress edge routers are responsible for burst assembly and disassembly functions, and serve as legacy interfaces between the optical switched network 4 and conventional electronic routers.

Figure 2:
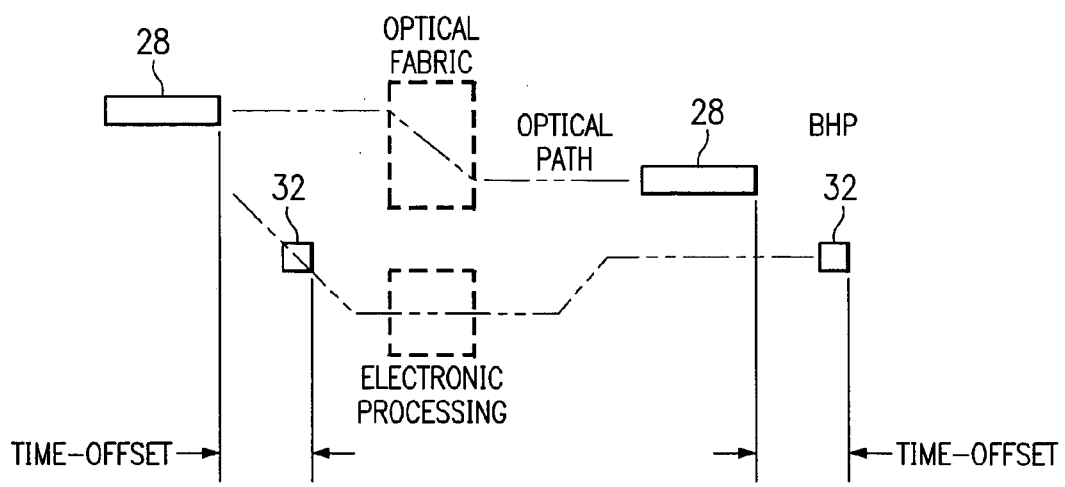
FIG. 2 illustrates concepts of data bust and BHP.

As in FIG. 2, a burst 28 will not be terminated electronically when it is transmitted across a hop within network 4. It will "fly" across the network. In order to guide the "flying" course, a companion Burst Header Packet (BHP) 34 is transmitted prior to the departure of a data burst at previous hop. The BHP of an optical burst would contain network protocol header such as IP (Internet Protocol). It also contains information to describe its coupled optical data burst such as when it will arrive, in which channel it would arrive, and what is its length. This is to describe the temporal and spatial position of the associated optical burst relative to the temporal and spatial position of the BHP itself.

Figure 3:
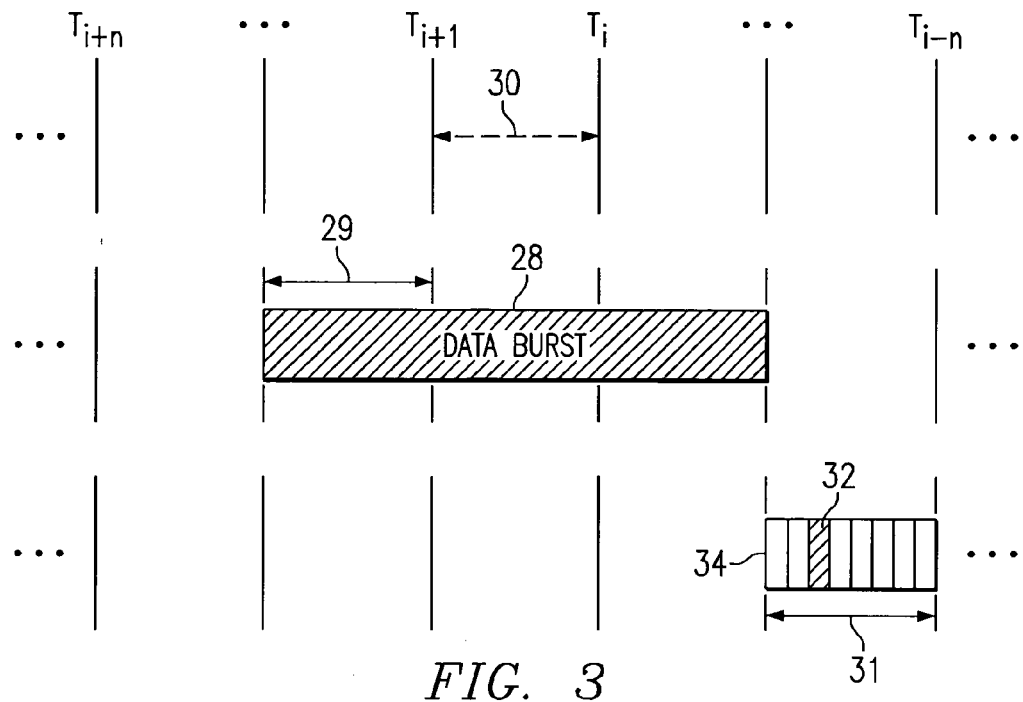
FIG. 3 illustrates concepts of slot, data slot, control slot, micro-slot and optical data burst.

As in FIG. 3, this invention assumes that both optical data bursts 28 and BHPs 32 are transmitted in synchronous fixed length slots 30. A slot 30 used to transmit an optical burst is referred to as a data slot 29. At least one data slot will be needed to transmit a burst. The consecutive sequence of data slots (at least one) that are used to transmit one burst is referred as a Slot Session (SS).

Slots that are used to transmit BHPs and other network Control Packets (CPs) are called control slots 31. To transmit BHPs and CPs, a control slot 31 is divided into Micro-slots 34. One BHP 32 uses one micro-slot 34. One CP would use at least one micro-slot. The consecutive sequence of micro-slots that are used to transmit a CP is referred as a Micro-Slot Session (MSS).

Figure 4:
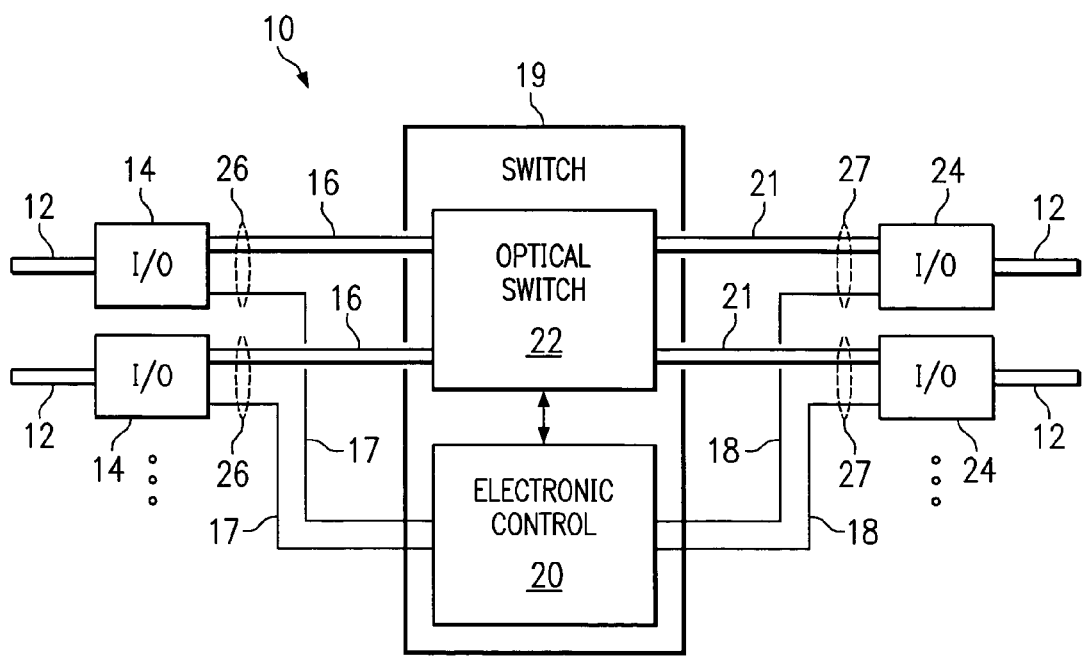
FIG. 4 illustrate a block diagram of optical router when BHPs are transmitted as Out-Band.

There are many possible ways to frame the transmission of data and control slots. A fundamental feature is whether BHPs are transmitted as In-Band or as Out-Band. When transmitted as In-Band, BHPs are always transported in the same DWDM (Dense Wavelength Division Multiplexing) channel as its associated burst is (see FIG. 32). When transmitted as Out-Band, BHPs are transmitted in a separate control channel that may provide BHPs transportation for a group of DWDM channels. FIG. 4 is a general block diagram of a burst switching based optical core router 10 using Out-Band BHP transmission. Optical fibers 12 carrying one or more channel groups 26 (incoming) or 27 (outgoing), with each channel group 26 or 27 including a control channel 17 (incoming) or 18 (outgoing) and a group of multiplexed data channels 16 (incoming) or 21 (outgoing). Incoming channel groups 26 are received by the ingress of I/O cards 14. At ingress, the ingress of I/O cards 14 separate the incoming data channels 16 and the incoming control channel 17 of the incoming channel group 26. It then sends the separated channels to switch 19. The incoming control channel 17 is sent to the electronic control 20 of switch 19 and the incoming data channels 16 are sent to optical switch 22 of switch 19. The electronic control 20, responsive to information from the incoming control channels 17, controls the path of bursts from on the incoming data channels 16 to a desired outgoing data channel 21. At egress, an outgoing control channel 18 and outgoing data channels 21 of an outgoing channel group 27 are sent to an egress of an I/O card 24, and be united and sent out through fiber 12.

Figure 5:
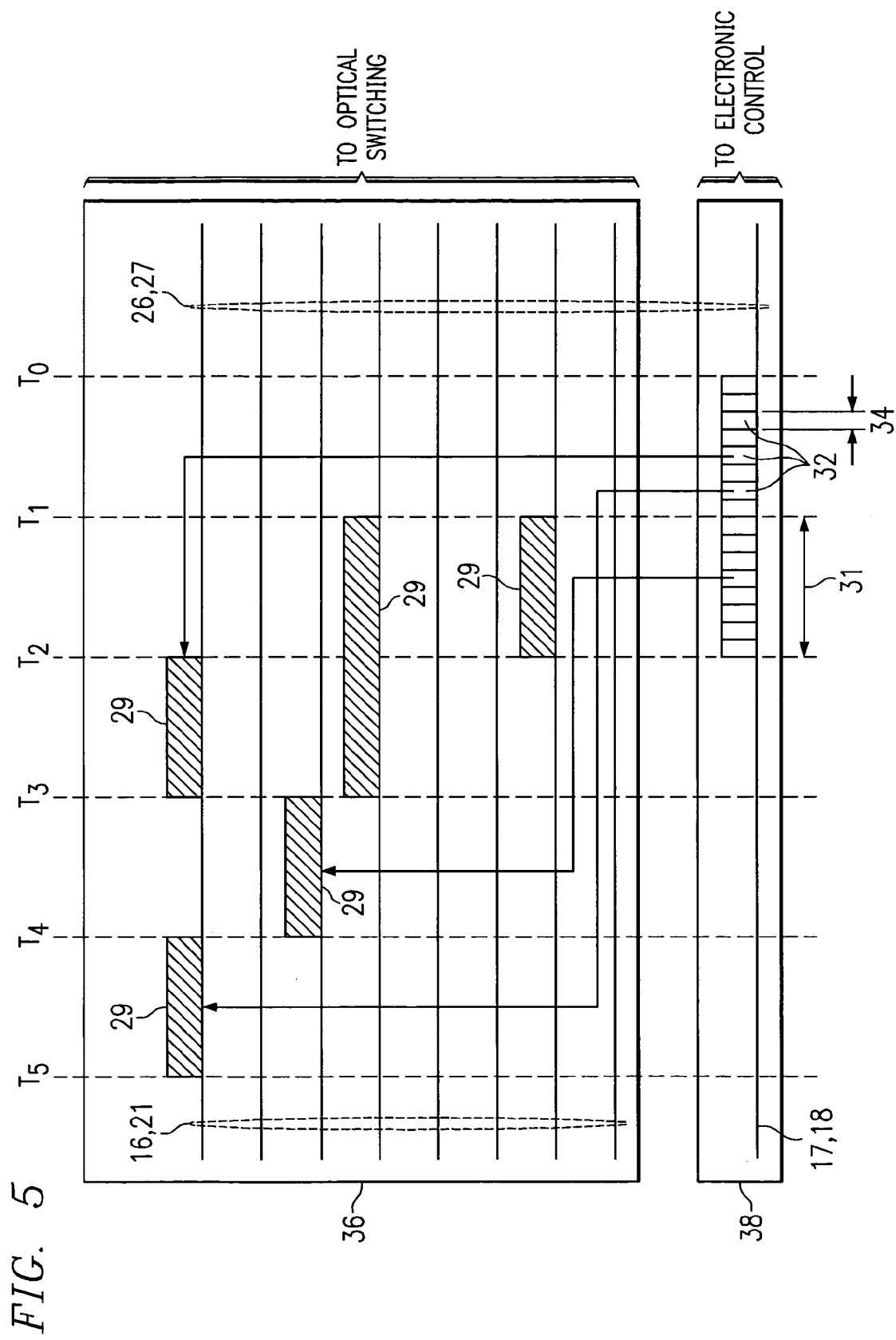
FIG. 5 is a timing diagram showing BHPs transmitted as out-band.

FIG. 5 illustrates transmission of data slots 29 and control slots 31 in a fiber 12 when BHPs are transmitted as Out-Band. DWDM channels in a fiber 12 are grouped together as channel groups 26 or 27. A channel group 26 or 27 includes one control channel 17 or 18 and a number of data channels 16 or 21. Each data channel carries data slots 29 that transmit bursts 28 by slot session. Each control channel carries control slots 31 that use micro-slots 34 to transmit BHPs 32 and CPs.

When data bursts 28 and their BHPs 32 are transmitted in this fashion, the number of micro-slots 34 within a control slot 31 will be a deterministic factor for burst arrival rate, since no burst 28 can arrive without an earlier-arriving BHP 34. Assuming that the average burst length in number of slots 30 is denoted by BL, the channel slot rate is $R_{slot}$, the number of data channels 16 or 21 in a channel group 26 or 27 is N, and the number of micro-slot in one slot is η, then there must be:

$$\eta \times R_{slot-c} \geq \frac{R_{slot-d1} + R_{slot-d2} + \ldots + R_{slot-dN}}{BL}$$

Assuming that all data channels and the control channel have the same channel slot rate, then:

$$\eta \times BL \geq N \quad (1)$$

This equation reflects the trade-off between channel group size, slot size, micro-slot size and burst size. For example, if 16 micro-slots (BHPs) are transmitted within a slot, and if the average burst length is two slots, then a fiber can support up to 32 data channels. Since BL=2 is a modest assumption, the above slotted transmission would not be a limitation for burst arrival rate.

In the following, the above transmission architecture will be used to illustrate the embodiment; the developed traffic model and method are, however, not limited to this architecture. For purposes of clarity, $T_{n^+}$ refers to a time after and near $T_n$, and $T_{n^-}$ refers to a time preceding and near $T_n$. The "$T_n$ slot" refers to the time duration from $T_{n^+}$ to $T_{n+1^-}$.

Referring to FIG. 4 and FIG. 5, the basic operation of the router 10 will be discussed. Data bursts 28 of optical information are received at the inputs of optical switch 22. For each data burst 28, the associated BHP 32 arrives in a preceding control slot 31. The BHP, which contains the information defining the desired routing of it associated burst, is converted to electronic form. The information in the BHP is used by the electronic control 20 to configure the optical switch 22 prior to the arrival of the data burst 28. When the data burst arrives, the optical matrix 22 is already configured to switch the burst 28 to the proper desired outgoing data channel 21 or to fiber delay line as described in greater detail below. Accordingly, the bursts 28 can be switched through router 10 without conversion of the burst data into electrical form. The BHPs 32 are converted back into optical form and reunited with their associated data burst 28 in the egress of I/O card 24. The BHP 32 must continue ahead of the burst 28 in order for switching to occur in the optical domain.

Figure 6:
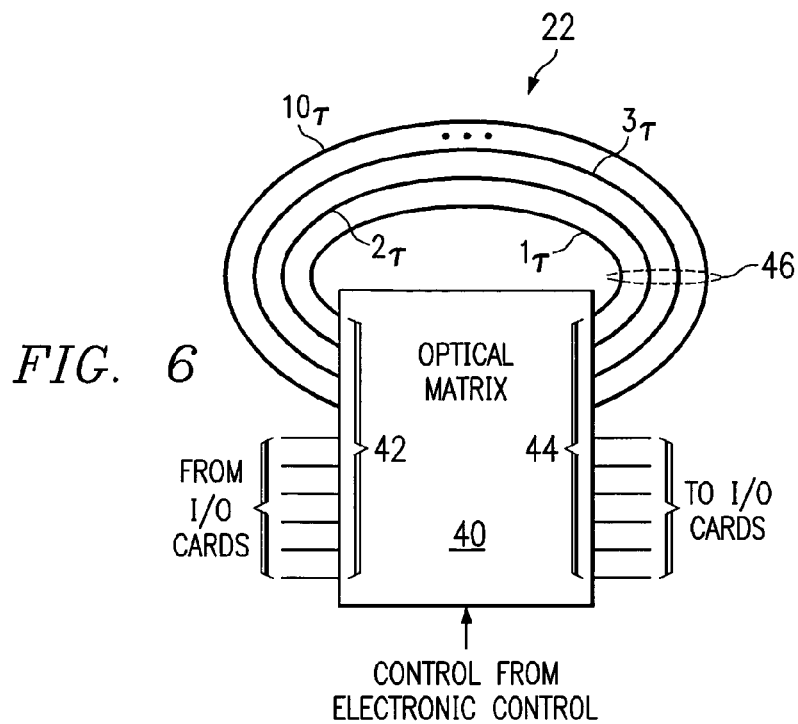
FIG. 6 illustrates a block diagram of an optical switch matrix.

FIG. 6 illustrates a more detailed block diagram of the optical switch 22. Optical switch 22 includes optical matrix 40, having input ports 42 and output ports 44. One or more fiber delay lines (FDLs) 46 are coupled between certain input ports and output ports, and there are multiple possible delay values. This invention assumes that the basic delay value τ is the same as one slot 30 duration, and a delay value of a FDL is always an integral numbers of the basic delay τ. Multiple delay lines 46 may be assigned to some delay values. For example, there may be five 1τ delay lines and five 1τ delay lines. The remainder of the input ports 42 and output ports 44 are coupled to individual data channels from fibers 12.

In operation, the electronic control 20 sets the paths (from an input port 42 to an output port 44) through the optical matrix 40. Each incoming data channel 16 is coupled to an input port 42 and each outgoing data channel 21 is coupled to an output port 44. Generally speaking, an incoming data burst 28 may be switched to any available output port 44. The associated BHP 32 will indicate a specific output channel group 27 as the destination. The electronic control 20 will find an available output data channel on the outgoing channel group 27 and direct the data burst 28 to that data channel.

In some cases, it is desirable to delay a data burst prior to sending it to a data channel. This may occur, for example, if no data channel is currently available on the selected output port 24. In this case, the data burst 28 is directed to an output port 44 connected to a delay line 46. The burst will travel through the delay line and be reconnected at the input port 42 coupled to the delay line 46. Once the data burst 28 has emerged from the delay line 46, the optical matrix 40 switches the corresponding input port 42 to the output port 44 of the desired outgoing data channel 21. Hence, the optical data can be delayed for a short period of time without any conversion to the electrical domain.

Figure 7:
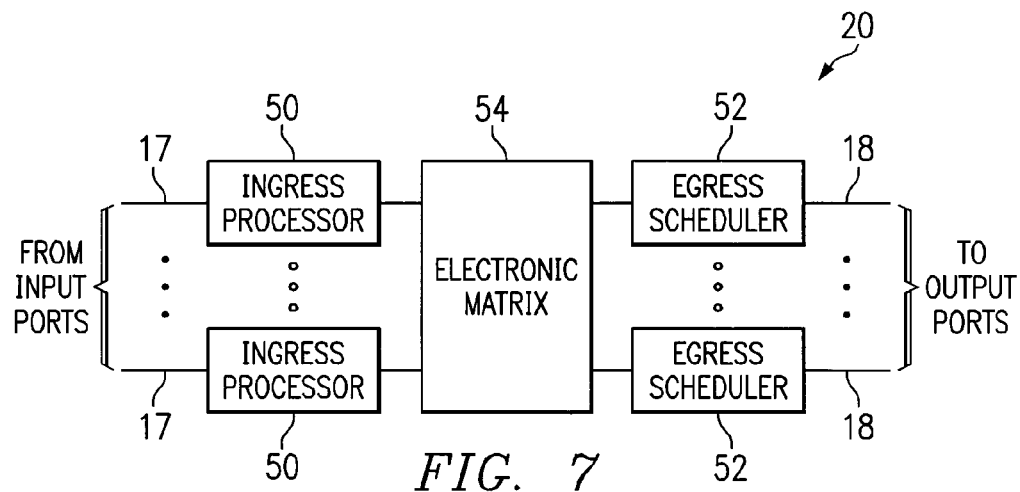
FIG. 7 illustrates a block diagram of the electric control of an optical router.

FIG. 7 illustrates a more specific block diagram of the electronic control circuitry 20. The electronic control circuitry 20 includes ingress processors 50 for each incoming control channel 17, egress schedulers 52 for each outgoing control channel 18 and an electronic matrix 54 for connecting any ingress processor 50 to any egress processor 52.

In operation, when a BHP 32 arrives on an incoming control channel 17, it is processed by the electronic control circuitry 20. The ingress processing 50 and the electronic matrix 54 of the electronic control circuitry 20 handle the traditional packet forwarding and routing functions of a router. Accordingly, the ingress functions convert the optical BHPs 32 into electrical BHPs 32. Each BHP contains the destination information that defines the desired output channel group 27 for the associated packet. Based on this information, the BHP is routed through the electronic matrix to the correct egress scheduler 54.

There is a complete overlap between optical matrix output channel group and electronic matrix output port, and there is an egress scheduler 52 for every electronic matrix output port. An egress scheduler 52 handles the requests of the BHPs that have been forwarded to it, as described in greater detail below. For purpose of this specification, a slotted scheduling method is presented.

Figure 8:
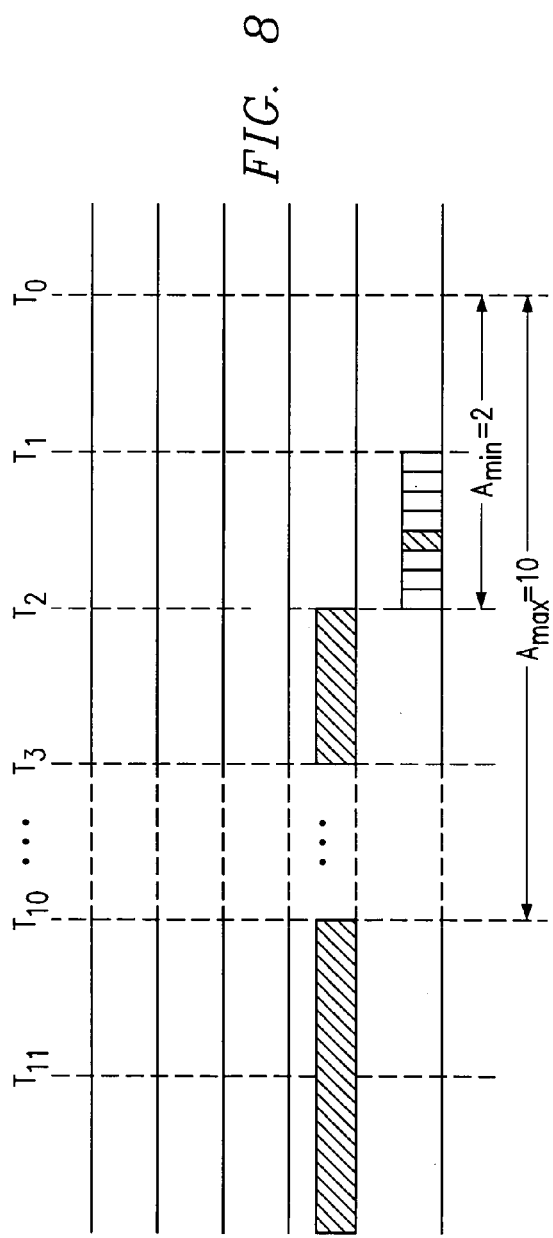
FIG. 8 illustrates a timing diagram showing maximum and minimum arrival times for a burst relative to its header.
Figure 9:
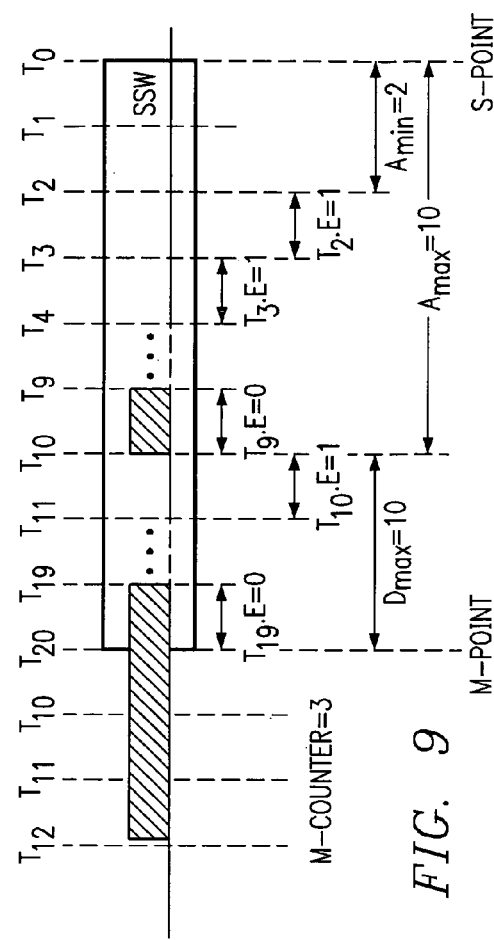
FIG. 9 illustrates a timing diagram showing a Slot Sequence Window (SSW)

FIG. 8 illustrates a timing diagram showing minimum $A_{min}$ and maximum $A_{max}$ arrival time of bursts 28 relative to their BHPs 32. $A_{min}$ and $A_{max}$ are both described in terms of slots. Hence, in FIG. 8, $A_{min}=2\tau$ and $A_{max}=10\tau$. The values of $A_{min}$ and $A_{max}$ are depending upon system design factors such as burst loss rate, burst delay and so on. FIG. 9 illustrates how burst loads for a channel are modeled. In the illustrated embodiment, the burst load for each data channel of an output fiber is modeled based on $A_{min}$, $A_{max}$, and delays attributable to the fiber delay lines (FDLs) 46. As described above, the basic fiber delay line unit τ, which is the same as a slot time period, and the delaying time units of the cascaded output of a fiber delay line will be always an integer number k times the basic unit τ. The maximum possible delay through a fiber delay line 46 is denoted as $D_{max}$.

When a slot with data ($slt_i$) arrives at optical switching matrix 40, it can be switched to an output either immediately or $D_k$ slot time periods later. In this model, a vector dlt=($D_0$, $D_1$, $D_2$, . . . , $D_k$) denotes the possible delay values, where $D_0$ is defined as no delay and $D_k$ means a k slot duration delay. For each delay value $D_k$, there may be multiple delay lines. The number (m) of delay lines can be different for each delay value $D_k$. Fore example, there could be three $D_1$ delay lines 46, two $D_2$ delay lines 46 and two $D_3$ delay lines 46. The number of entries to FDL is normally not equal to the number of input or output channels. In FIG. 4, there are N channels, and m fiber delay lines 46.

In burst switching, traffic will be distributed to output channels by bursts 28, which may occupy multiple slots 30. A burst 28 has variable number of slots, and various arrival times relative to its BHP 32. Therefore, the distribution of bursts to output channels becomes a problem, since the availability of both an output channel on the desired output fiber and a fiber delay line 46 becomes dependent upon previous transmitted bursts.

To increase the efficiency of scheduling the switching of bursts, a discrete time model for the burst load up to the maximum delay of a channel is provided. In order to model the loading condition of a channel, time window is defined, referred to herein as the Slot Sequence Window (SSW), shown in FIG. 9. The SSW contains a fix length sequence of discrete time points $T_0, T_1, \ldots, T_m$. For every $T_i \in SSW$, $T_{i-1}$ is called its predecessor, and $T_{i+1}$ is called its successor. The start of the sequence $T_0$, also called S point, has no predecessor, and the end of the sequence $T_m$, also called M point, has no successor. The S point is defined as the time at which the BHP 32 of a burst 28 arrives at the traffic scheduler 52 of an outgoing channel group 27. The $A_{max}$ point (FIG. 8) is the maximum time offset from S point for the burst arrival time at the optical matrix 40. The $A_{min}$ point defines the minimum time offset from S point for the burst arrival time at the optical matrix 40. The M point is the maximum delay ($D_{max}$) from the $A_{max}$ point for the burst that can be provided by a fiber delay line 46, once the burst 28 has reached the optical matrix 40.

Many system actions are defined in association with the time points within the sequence. A burst brst has "arrived" at point $T_i$ if at $T_{i^-}$ it may have not arrived, but at $T_{i^+}$ it would have arrived. A burst brst has "left" point $T_i$ if at $T_{i^-}$ it may still be with the system, but at $T_{i^+}$ it would have left. A time point $T_i$ has been "occupied" if the period from $T_{i^+}$ to $T_{i+1^-}$ has been assigned to an incoming burst, otherwise the time point is "empty".

A variable E is used to denote that if a time point $T_i$ is empty or occupied. If $T_i.E=1$, $T_i$ is empty, otherwise if $T_i.E=0$, $T_i$ is occupied. Therefore, a SSW has a corresponding "E-list" composed of the value of the E variable of the time points. An E-list denotes that which time point of SSW is empty, and which has been occupied. The M point has one more variable denoted as the "M-counter". The M-counter is used in cases where the M point is occupied; it counts the number of slots cycles before M point becomes empty again. In other words, the M-counter counts the number of slots of a burst 28 that lie outside of the SSW.

Since all the time points in SSW are relative to the S point, and the S point is a BHP's arrival time, properties defined in SSW are BHP arrival time specific. Therefore, even if two bursts arrive at the same time, as long as their BHPs arrive at different times, they see different SSW windows. Similarly, if two bursts arrive at different times, as long as their BHPs arrive at the same time, they have the same SSW windows.

Figure 10:
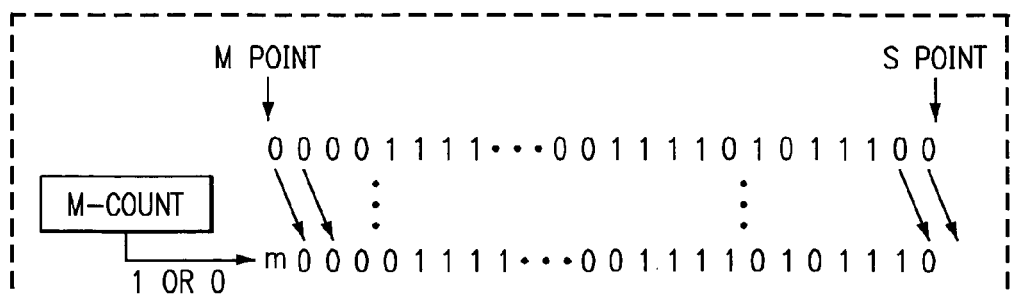
FIG. 10 illustrates a timing diagram showing shifting of a SSW.

When a BHP arrives at the channel scheduler 52, the effects of all the previous bursts' transmission can be counted by shifting the E-list. At every new slot time point, the E-list will be right-shifted as it is shown in FIG. 10. The S point E value of the previous SSW will no longer be counted by the scheduler. The M point E value of current SSW will be determined by value of M-counter. If the M-counter does not equal to 0, the E value of the M point of current SSW will be set as 0, and M-counter will be decreased by 1. If M-counter does equal to 0, then E value of M point will be set as 1.

A $\delta(t)$ function can be used to more formally represent E-list of an SSW at time $v$ as follows:

$$E\text{-}list(v)=\{E_1, E_2, \ldots, E_j, \ldots, \text{where}$$
$$E_j=(T_j.E)\delta[(v+j\tau)-t]\quad\quad(2)$$

where $v$ inside the expression (2) represents the S point. The shifting effects can be represented as:

$$E_j(v)=E_{j-1}(v+1)\quad\quad(3)$$

Expression (2) and (3) have demonstrated the generality of the traffic model. Variable $v$ in expression (2) represents a viewpoint of interest, $\tau$ represents the basic unit duration for data slots, control slots and delay lines. The length of the E-list represents the operation window of the scheduler, which is defined by maximum time offset and maximum delay value. Expression (2) shows that the loading condition of a channel within the operation window can be exactly described, and expression (3) shows that the connection of such windows in consecutive time sequence. Therefore, the traffic condition of a channel can be accurately described. This model relies on only assumptions of synchronous transmission of data 29 and control 31 slots 30, and different integral numbers of the slot-duration-delay-lines 46. Specially, it is independent of the transmission frame of data and control slots.

Therefore, the shifting process can take account of all the effects of previous burst transmission, but it is independent from the process of allocating the A point (arrival point) of an incoming burst. Accordingly, the receiving process at the ingress of the optical matrix 40 can be separated from the receiving process at the ingress of the electronic matrix 54. This can provide flexibility in system configuration of the synchronization process.

By representing the loading status of a channel in terms of the E-list of a SSW, an efficient channel group scheduling process can be developed. The example of FIG. 11 demonstrates how to use the SSW E-list to schedule the bursts.

Figure 11:
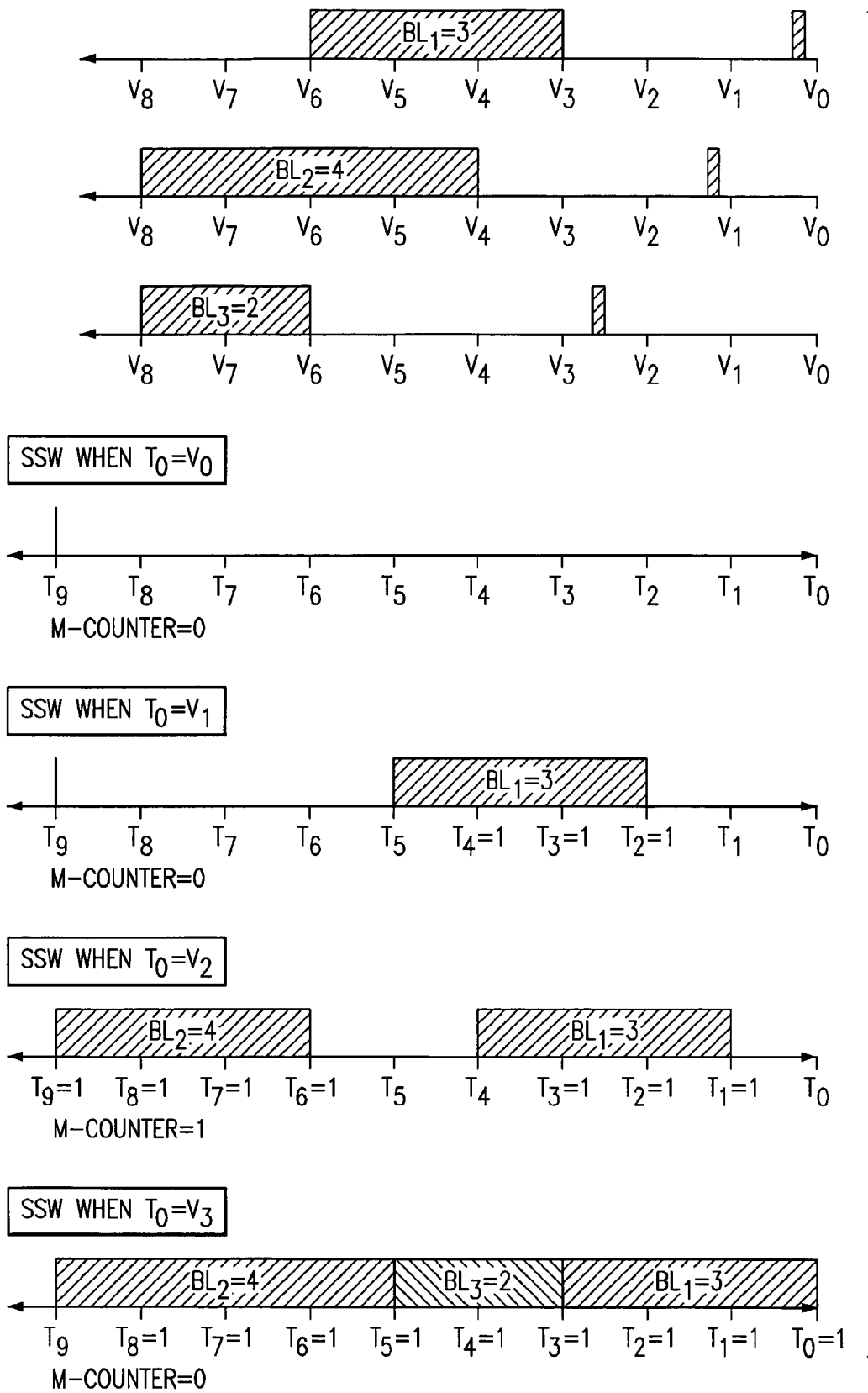
FIG. 11 illustrates an example of scheduling bursts.

There are three bursts to be scheduled in FIG. 11: $BL_1$, $BL_2$, and $BL_3$. The associated BHPs 32 arrive at different times. Burst $BL_1$ is three slots in length and its BHP arrives between $v_0$ and $v_1$. Burst $BL_2$ is four slots in length and its BHP arrives between $v_1$ and $v_2$. Burst $BL_3$ is two slots in length and its BHP arrives between $v_2$ and $v_3$. In the present example, it is assumed that there are three FDLs 46 in the system; they can delay two, four or six slot time periods respectively. Further, for this example, the maximum off-set of burst arrival time from its BHP arrival point is three slot periods. Therefore, in this example, there is a SSW window of nine slot periods ($A_{max}=3$ and $D_{max}=6$). Accordingly, the SSW time sequence ranges from $T_0$ to $T_9$.

At $T_0=v_0$, the SSW is empty and ready. $T_3$ corresponds to the maximum arrival time of bursts relative to S point $T_0$. $T_5$, $T_7$, and $T_9$ correspond to the exits of the fiber delay lines 46 relative to $T_3$. They represent two, four, and six slot period delays respectively. $T_9$ is the M point; its M-counter is 0. Any time beyond $T_9$ is neither controlled nor managed. It should be noted that the FDL exit points are relative to its entry.

At $T_0=v_1$, $BL_1$ should have completed scheduling. Now, $T_2$ denotes the arrival time of $BL_1$ relative to the S point. $T_4$, $T_6$ and $T_8$ denote the FDL exits relative to burst arrival time $T_2$. Since all the points are empty, there is no need to delay the incoming burst. After the scheduling, $T_2$, $T_3$, and $T_4$ are occupied. In FIG. 9, $T_i=1$ is used to denote $T_i.E=0$.

When $T_0=v_2$, the previous SSW is right shifted, and $BL_2$ will be scheduled based on the shifted SSW. $T_2$ corresponds to the arrival time of $BL_2$ relative to the S point. $T_4$, $T_6$ and $T_8$ denote the FDL exits relative to burst arrival time $T_2$. Since $T_2$, $T_3$ are occupied, $BL_2$ will be delayed. In choosing which FDL to use, two facts are important. The first consideration is whether there is a gap in the SSW that can accommodate the burst from the exit of the FDL. The second consideration is whether there is an FDL entry available. In FIG. 9, it is assumed that there is no entry available for the 2-slot-time FDL.

It should be noted that when $BL_2$ is scheduled to be sent out at $T_6$, its span will excess the SSW window. For situations where the span of a scheduled burst exceeds the boundaries of the SSW, the M-counter variable of the M point is used to indicate the number of slots occupied the burst outside the SSW. In this case, M-counter=1, since $BL_2$ is one slot over the window.

When $T_0=v_3$, the previous SSW would be right shifted again, and $BL_3$ will be scheduled based on the shifted SSW. $T_3$ denotes the arrival time of $BL_3$ relative to the S point. $T_5$, $T_7$ and $T_9$ denote the FDL exits relative to burst arrival time $T_3$. Since $T_3$ and $T_4$ are not occupied, burst 3 can be scheduled as in FIG. 9.

As shown in the example of FIG. 9, this procedure does not guarantee the order of the bursts. Although $BL_2$ and its BHP arrive earlier than $BL_3$, $BL_3$ sets out earlier from this node.

Figure 12:
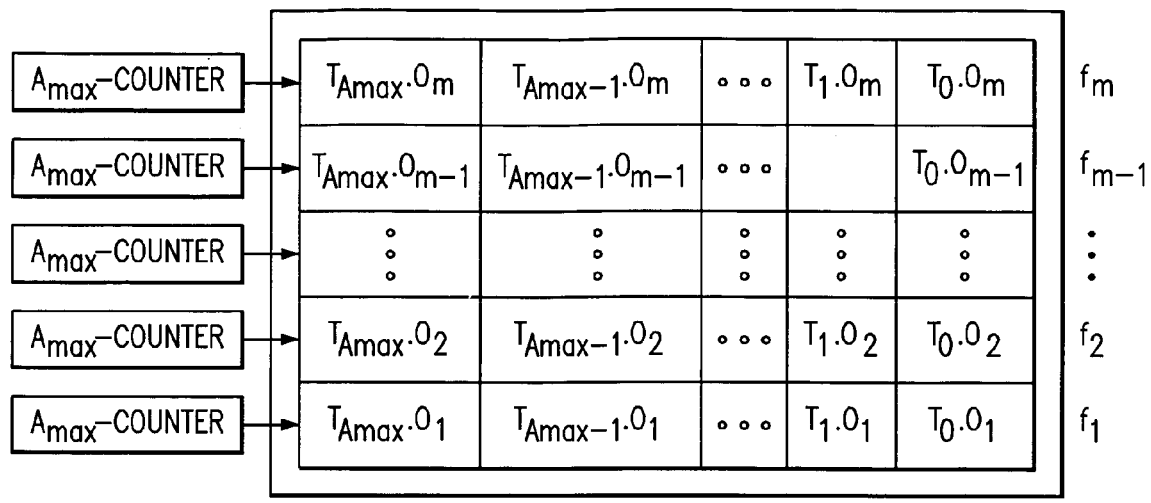
FIG. 12 illustrates a Fiber Delay Line Entry Status Window (FESW)
Figure 13:
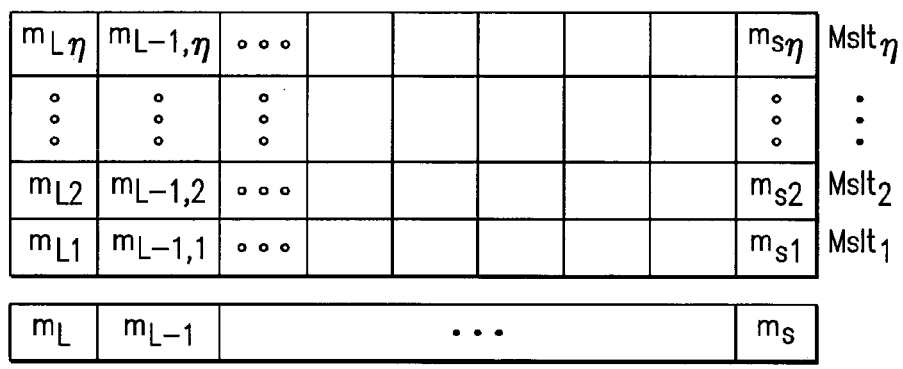
FIG. 13 illustrates a Micro-Slot Status Window (MSSW)

FIG. 12 and FIG. 13 illustrate the modeling of FDLs 46 and the BHP micro-slots 34. The availability of either a FDL 46 or BHP micro-slot 34 can be a bottleneck for scheduling a burst. With concept of SSW, models for both FDLs 46 and the BHP micro-slots 34 can be easily created.

The entry status of each fiber delay line 46 can be modeled over a window inside SSW. FIG. 12 illustrates a model for a delay of $D_k$edlt with m entries. For purpose of supporting SSW based scheduling, for every $D_k$, it is necessary to know at every possible burst arrival time, whether there are entries available, and how long the gap is. Notice that this is needed because each FDL 46 is shared among channels. If an FDL 46 is used by one channel only, the SSW should be able to represent the status of its FDL 46.

For every entry $E_k$ of a FDL $D_j$, there is an FDL Entry Status Window (FESW) associated with it. FIG. 12 shows m entries ($f_1$ through $f_m$) for delay $D_k$. Every FESW starts from the S point, and ends at the $A_{max}$ point, i.e., $T_0, T_1, \ldots, T_{Amax}$. A variable O is associated with every time point $T_i$ of the window. If $T_i.O_x$ is equal to 1, means that the $f_x$ (where x is between 1 and m) entry of FDL $D_k$ is empty at $T_i$. Otherwise, if $T_i.O_x$ is equal to 0, means that the $f_x$ entry of FDL $D_k$ is occupied at $T_i$.

Therefore, when a burst is switched to entry $f_x$ of an FDL $D_k$ at $T_l$, the O values of the FESW for entry $f_x$ will be set to "0" from $T_l$ to $T_{l+BL-1}$. If $T_{l+BL-1}$ spans beyond $T_{Amax}$, the $A_{max}$-counter will be used; hence, $O_m$ will be set to "0" from $T_l$ to $T_{Amax}$ and the $A_{max}$-counter will be set to i+BL−1−$A_{max}$. Like SSW, FESW will right shift once every slot cycle. The $A_{max}$-counter records the number of slot cycles before $T_{Amax}$.f be set to 1. Use of $A_{max}$-counter is like the use of M-counter in SSW windows.

The process of finding an FDL entry through FESW is simpler than finding a suitable gap through SSW, since all the matches would start from the burst arrival time point, and this point only.

In the same way, the availability of micro-slots can be represented over a window inside SSW. FIG. 13 illustrates a Micro-Slot Status Window (MSSW). The MSSW starts from S point, and ends at L point. The L point is set to the M point, minus the minimum time offset between a data burst and its BHP.

The MSSW records the status of control channel egress. From a scheduling point of view, for every slot time point from S to L, the egress scheduler 52 needs to know if there are micro-slots 34 available. A micro-slot 34 can be used to transmit BHPs as well as CPs. This can be achieved easily using the same mechanism as used to model FDLs' availability. Assuming that there is a time sequence $T_0, T_1, \ldots, T_L$ for every MSSW, a variable $m_{ik}$ can be associated with every time point $T_i$ of the window, specifying the availability of the associated time slot. If $T_i.m_{ik}$ is equal to 1, the micro-slot $Mslt_k$ of $T_i$ is occupied. Otherwise, if $T_i.m_{ik}$ is equal to 0, the $Mslt_k$ micro-slot of $T_i$ is available. As with the SSW and FESW, the value of m will be right shifted once every slot cycle.

When a burst is scheduled to send out at slot time point $T_j$, the egress scheduler 52 searches the $[T_{j-min\_offset}, T_{j-max\_offset}]$ segment of the MSSW window for a free micro-slot for its corresponding BHP. This search processing can save a little more time if a variable $m_j$ is used to represent the logical AND of all the $m_{jk}$ $$(k = 1, \ldots, \eta), \text{ that is } m_j = \bigcap_{k=1}^{\eta} m_{jk}.$$

If $m_j$ equals to 0, means that there is at least one micro-slot available in slot $T_j$, otherwise it means that all the micro-slots of the slot $T_j$ have been used.

Figure 14:
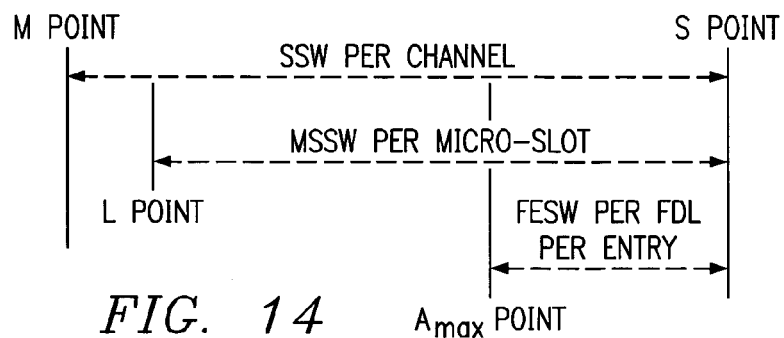
FIG. 14 illustrates the relationship between the SSW, FESW and MSSW.

In summary, a traffic model is disclosed for slotted burst over a switched optical channel. It is developed based on a basic fact that an FDL buffer capable optical switch could only monitor and manage a limited time window, and all the consequence of previous burst transmission can be counted by right shifting the window. With this model, burst transmission requests can be scheduled efficiently. FIG. 14 shows timing relations between the windows in the model. The Slot Sequence Window (SSW) is defined on channel basis, the Micro-Slot Status Window (MSSW) and FDL Entry Status Window (FESW) are shared among the channels. The MSSW is on micro-slot basis, while FESW is per entry point and per FDL.

All windows will be right shifted once per slot cycle. The right most value of previous slot will become past, and will not be used for any more. The left most value of the new window will be determined through recorded variables. M-counter and $A_{max}$-counter are defined for this purpose.

Figure 15:
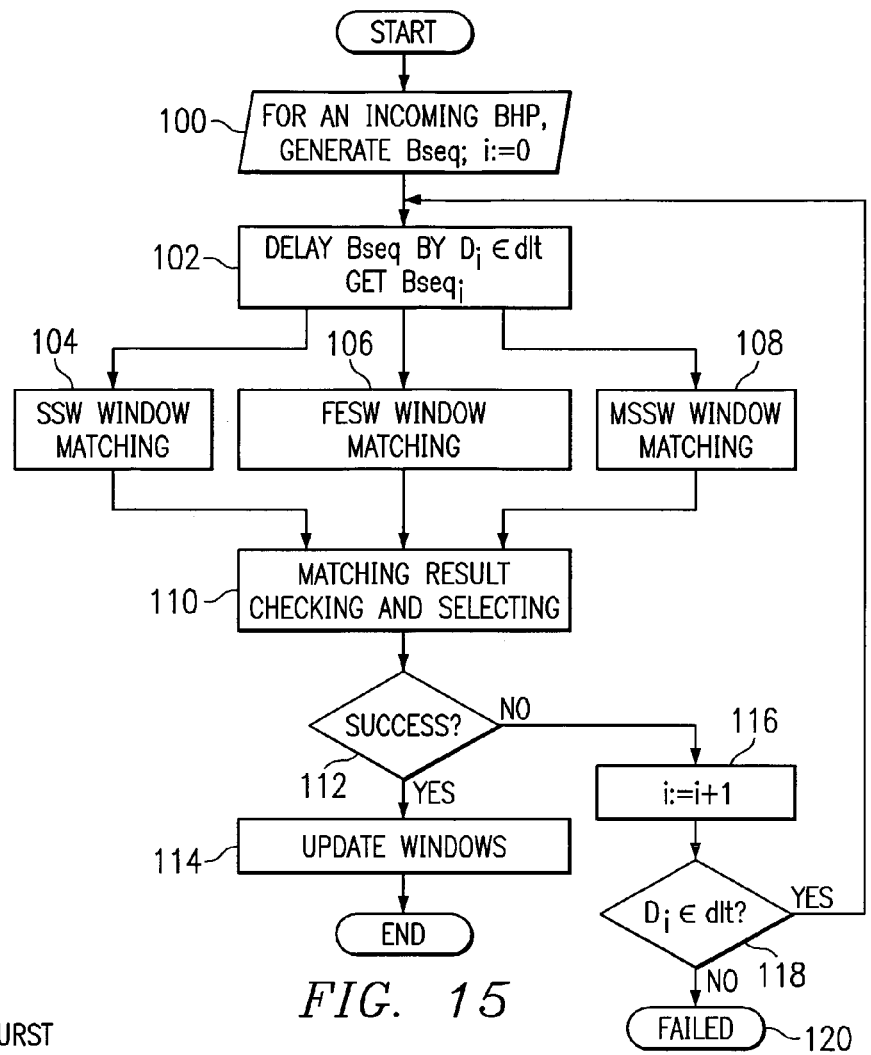
FIG. 15 illustrates a flow diagram describing the scheduling method.

The slotted burst scheduling process can be implemented as shown in FIG. 15. The basic idea is that by the time a BHP arrives, the system will convert the burst description in BHP (burst arrival time, burst length) into a bit sequence representation, referred to herein as Bseq. The Bseq tells the system in terms of SSW when the burst would arrive, and the bursts length. If the Bseq expands over the M point of SSW, the rest of it will be recorded in a variable called B-counter. A very important technical feature of this invention is that by adjusting the Bseq representation of burst arriving time and the B-counter, Bseq patterns would be able to take account the effects of different delays $D_k$s. Based on this, the scheduling method can consider a specific delay choice once per processing cycle, as described below, until a match been found.

Advantageously, for a specific $Bseq_i$, the processes for finding a match with SSW, FESW and MSSW are independent, and they can be implemented by combinatory circuit and can be executed in parallel.

In step 100, when a Burst Header Packet (BHP) arrives, it holds a definition of the incoming burst: when it will arrive, and how many slots it has. This information is converted into a bit sequence representation Bseq, and then use this bit representation to find out a suitable gap within the SSWs, together with the conditions in FESW window and MSSW window. The effects of FDL buffer can be counted by generating different Bseq representations of the same burst that has different arriving time.

The Bseq representation of a burst is defined the same as the E-list over SSW window. Only in this case, "1" represents that a slot time point is needed by a burst, and "0" to represent that the point is not needed.

For worst-case scenarios in FIG. 15, for one incoming burst, k bit representations are generated, namely, $Bseq_0$, $Bseq_1$, ..., $Bseq_k$. For a burst that spans over the SSW window, a variable called B-counter records the bits that are outside the SSW.

Figure 16:
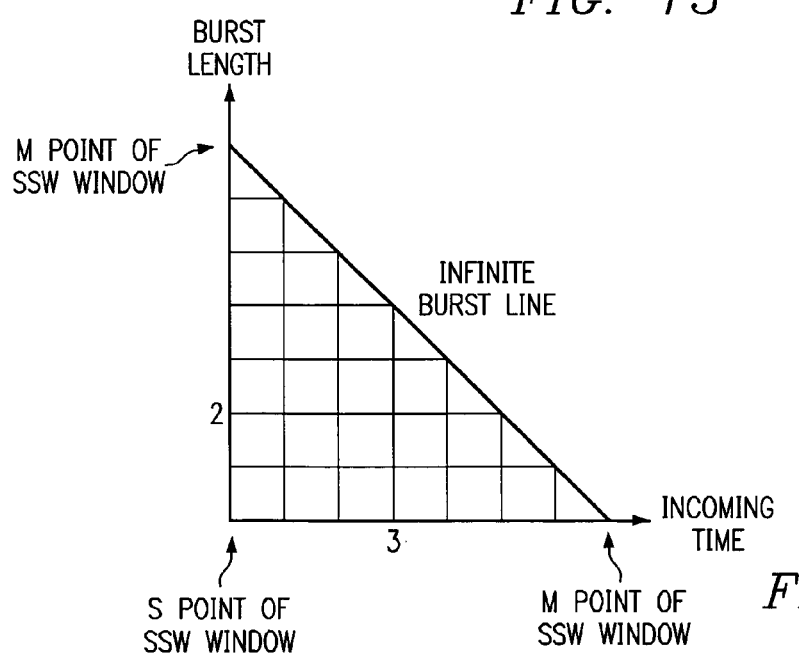
FIG. 16 illustrates a diagram showing the finite number of burst bit patterns.

Since the length of a burst varies, it might be assumed that a bit representation be only generated when a burst has been received. In fact, the number of all possible bit representations is definite. It is decided by the size of the SSW window. As it is shown in FIG. 16, there are finite numbers of possible combinations of the incoming time slot point and its length within the SSW window. If a burst has slots coming after the M point, it will be regarded as an "infinite burst". For an infinite burst, the slot length after the M point will be represented by the variable called B-counter. An infinite burst will occupy M point until B-counter becomes 0. An infinite burst can match with a SSW if and only if the SSW's M-point is not occupied.

Therefore, in the preferred embodiment, all the possible bit representations of incoming bursts are saved, then retrieved when a burst comes using (start time, length) definition inside the BHP. In this way, the space complexity of this method is determined by size of SSW window. If the size of SSW is $S_{ssw}$, then the number of stored patterns is $(S_{ssw})^2/2$.

Referring again to FIG. 15, in step 102, Bseq is delayed by $D_i$. In the first iteration, $D_i=0$ (i.e., no delay). Simultaneous matching with the SSW, FESW and MSSW is performed in steps 104, 106 and 108, respectively.

Figure 17:
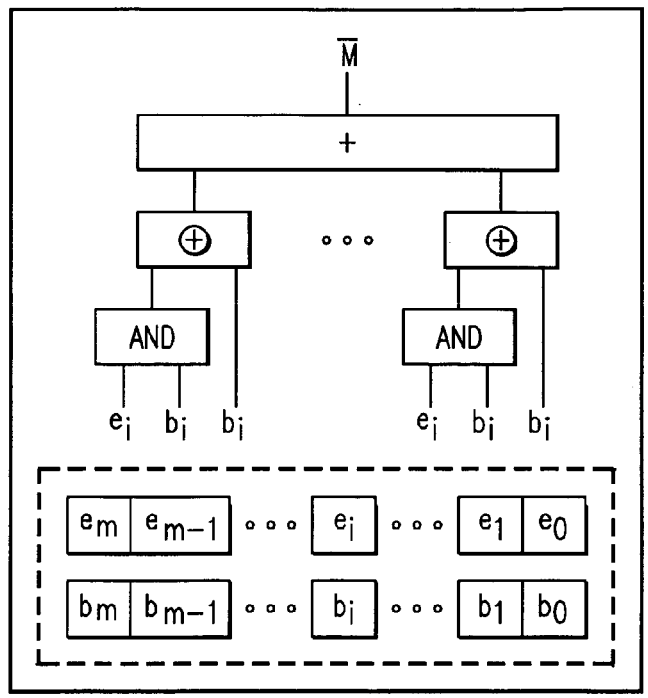
FIG. 17 illustrates combination logic for matching within a SSW.

In step 104, the matching is performed in the SSW. The number of SSW windows is equal to the number of data channels. The matching can be implemented using simple bit level logical operations. As shown in FIG. 17, for an E-list=$(e_0, e_1, ..., e_m)$ and $Bseq_i=(b_0, b_1, ..., b_m)$, the matching can be performed by the operation:

$$\overline{M} = \sum_{i=0}^{m} (e_i \cdot b_i) \oplus b_i$$

When $\overline{M}$ equals to 0, this E-list matches with the $Bseq_i$, otherwise, when $\overline{M}$ equals to 1, the E-list does not match with the $Bseq_i$.

The number of SSW windows is equal to the number of data channels. Therefore, there is a selection process for every $Bseq_i$, since there might be more than one such match. The selection process should choose the gap that fits the burst best, and leave the more space the possible. The match operation for every SSW can be done in parallel.

In step 106, the matching is performed in the FESW. The same principle of step 104 applies to the match operation for FESW. For the whole system, the number of FESW is comparatively larger. If there are k levels of delays, and M entries for each delay, then there are k×M FESW windows.

But for a processing cycle of the scheduling process, since every cycle only tries to match with one possible delay, the search space is M. They also can be done in parallel.

In step 108, matching is performed in the MSSW. The search process for micro-slot is fairly simple. Once a $Bseq_i$ is given, the burst departure time is also defined, so by using the maximum and minimum time offset, the searching area of the MSSW windows is known. With the model of MSSW like in FIG. 13, a deterministic result can soon be found.

In step 110, the matching results are checked and, if the burst can be scheduled using a delay $D_i$ (step 112), the MSSW, FESW and SSW windows are updated in step 114. Otherwise, if a scheduling cannot occur in step 110, the delay $D_i$ is incremented in step 116. If the delay $D_i$ is within the delay range in step 116, the sequence of steps 102–110 is repeated with the new $D_i$ and $Bseq_i$; else, the burst is dropped in step 118, because it cannot be scheduled at any available delay.

Figure 18:
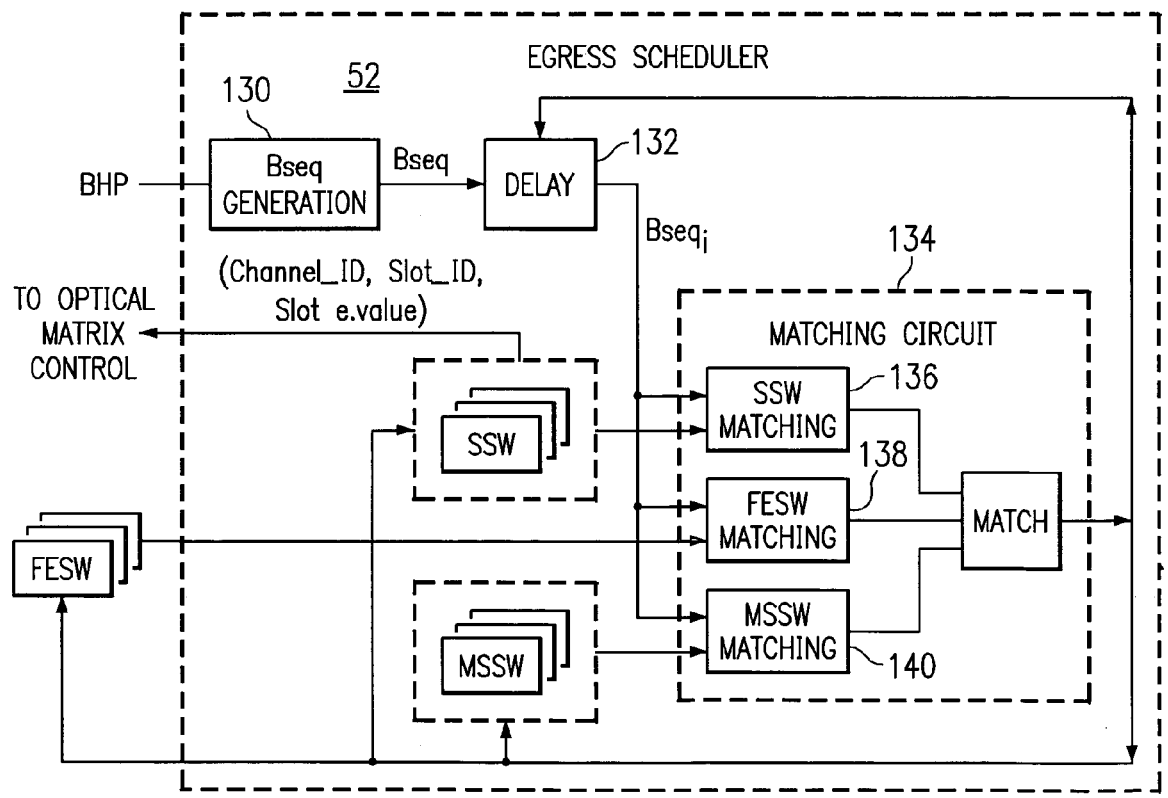
FIG. 18 is a block diagram of an egress scheduler.
Figure 19:
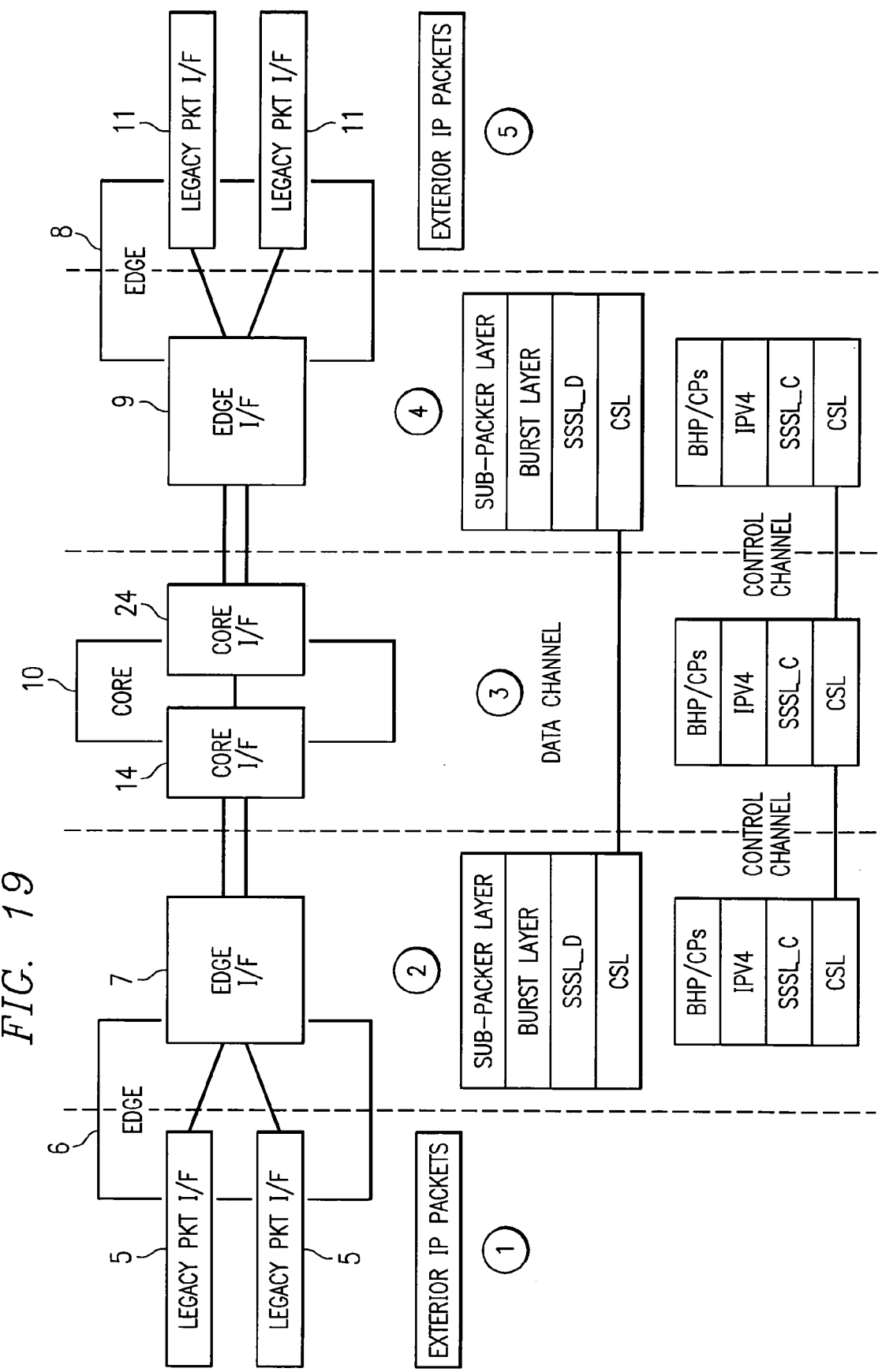
FIG. 19 illustrates a block diagram of protocol processing stages.

FIG. 18 illustrates a block diagram of an egress scheduler 52. The BHP 32 is received by a Bseq generation circuit 130, which generates a Bseq based on the length and time of arrival information of the BHP, as described above. A shift circuit 132 shifts the Bseq according to the current delay (step 102 of FIG. 13). The shifted Bseq is input to a matching circuit 134. The matching circuit 134 performs three matches in parallel. The SSW matching circuit 136 determines whether the current Bseq can fit in one of the SSW (there is one SSW for each data channel in the data channel group associated with the egress scheduler 52). The FESW matching circuit 138 determines whether a delay line with the current delay will be available when the burst arrives. The FESW information (there is one FESW for each entry into each delay) is available to all egress schedulers 52. The MSSW matching circuit 140 determines whether there is an available micro-slot 34 in the control channel associated with the egress scheduler 52. The MSSW information is specific to the associated egress scheduler 52.

If there is a match in the matching circuit 134, i.e., if all three matching circuits 136, 138 and 140 match, information from the SSWs is sent to the Optical Matrix to control the path of the bursts. The information includes incoming burst channel ID, incoming slot ID, outgoing channel ID and outgoing slot ID and E value. If no match is found, another Bseq bit pattern of different delay is generated to attempt another match for a different delay time.

FIG. 19 through FIG. 31 illustrate a protocol architecture that may be used in conjunction with the optical burst network 4 described herein. As described in connection with FIG. 1, packets outside of the optical burst switched network are received at ingress routers 6; information in the packets are converted to bursts 28, which propagate through the optical burst switched network 4. At the egress routers 8, the bursts are converted back into packets. The protocol described herein provides format for representing information as it propagates through the optical burst switched network 4.

In this protocol architecture, each burst 28 is transmitted over one or more slots. Further, the BHPs 32 for various bursts 28 are transmitted within micro-slots 34 within a control slot 31. The protocol architecture describes a method of transmitting both bursts 28 through slot session and BHPs 32 and CPs through micro-slots. The scenarios of packets processing are described as in FIG. 19.

An ingress edge router 6 of network 4 distinguishes two interfaces. The "legacy pkt I/F" 5 refers the exterior IP interface, and the "edge I/F" 7 refers the interface to network 4. When an incoming IP packet arrives at the ingress edge 6 of network 4, it would be forwarded to an interface 7 based on its destination address;

At an interface 7, the processing are divided into data channel and control channel. On data channel, the ingress functions for the sub-packet layer, burst layer, SSSL-D (Service Specific Slot Layer for Data channel) layer and CSL (Common Slot Layer) are performed. On control channel, the ingress functions for BHP (Burst Header Packet), IP (Internet Protocol), SSSL-C (Service Specific Slot Layer for Control channel) and CSL (Common Slot Layer) are performed.

Within core router 10, data bursts 28 on data channel 16 or 21 will not be processed. The IP and BHP are processed. The functions of BHP, IP, SSSL-C and CSL for control channel will be performed.

Figure 20:
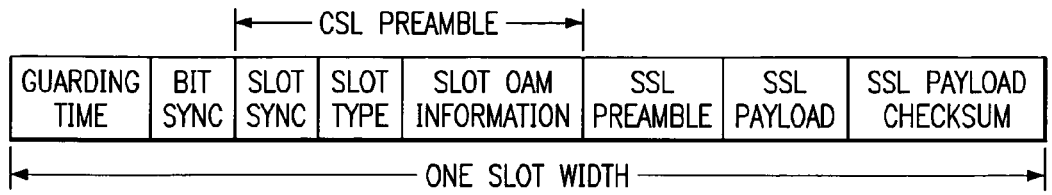
FIG. 20 illustrates the fields for a slot of information in a Common Slot Format.

At egress edge interface 9, egress functions of sub-packet layer, burst layer, SSSL-D and CSL are performed for data bursts 28. The exterior IP packets will be disassembled completely. In control channels 17 or 18, the BHP, SSSL-C and CSL are performed for BHPs 32;

The disassembled exterior IP packets be sent to corresponding "legacy pkt I/F" 11 using its original IP address;

In the following the structure of the protocols are presented. FIG. 20 illustrates a diagram of a slot of information in a common slot format. The common slot format (or Common Slot Layer, CSL) is designed for both data (bursts) and control (BHP) slots. The common slot layer has six parts: Guarding time and bit sync; CSL preamble; SSSL (Service Specific Slot Layer) preamble, Slot Payload and Slot check sum. These fields are described in Table 1.

TABLE 1

| | Common Slot Layer Fields |
|---|---|
| Guard time | The guard time is used as an edge to trigger the optical matrix synchronizers. The guard time has a maximum length. If the needed guarding time is less than the maximum length, it can be filled by bit sync. |
| Bit synchronization pattern | Bit sync pattern is necessarily to extract clock synch information at the transceiver. This pattern starts immediately after the guard time. In the preferred embodiment, bit synchronization pattern is minimum of 128 bits. |
| CSL preamble | The overhead information common for both data and control slot. It is also called the header of Common Slot Layer (CSL). |
| SSSL preamble | SSSL Preamble is the header of Service Specific Slot Layer (SSSL). The SSSL layer can be one of two types: the SSSL_D for a data channel and the SSSL_C for a control channel. Their header information is different |
| SSSL Payload | In a data slot, SSSL payload carries the data burst traffic. In control slot, the SSSL payload carries the Burst Head Packets (BHPs) and other network control and management messages (CPs). |
| SSSL Payload Check Sum | Used for error checking purposes |

The CSL preamble contains three fields. These are described in Table 2.

TABLE 2

| | Common Slot Layer Preamble Fields |
|---|---|
| Slot Sync | Slot sync is used for slot boundary recognition |
| Slot Type | Slot type field indicates the type of a slot. Four types of slots have been identified, they are data slot, control slot, idle slot and OAM (operation, administration and maintenance) slot. Idle slots are sent out when there is no data to send. OAM slots are used by optical transceiver for transmission OAM functions only. |

TABLE 2-continued

| | Common Slot Layer Preamble Fields |
|---|---|
| OAM address | OAM address refers to the transceiver where the loop back slot is going to be terminated. |

Figure 21:
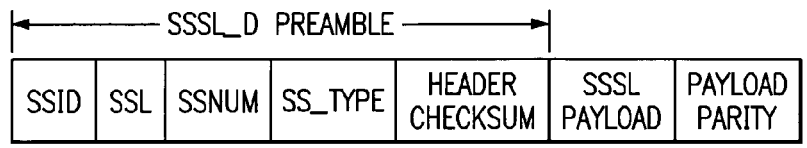
FIG. 21 illustrates the fields for Service Specific Slot Layer for a data channel.

As described in Table 1, the SSSL Preamble varies depending on whether the information in the SSSL Payload is either data or control information. If the information is data, a SSSL_D Preamble is used; if the information is control information, a SSSL_C Preamble is used. FIG. 21 illustrates a SSSL_D for data information. The fields of the SSSL_D are shown in Table 3.

TABLE 3

| | SSSL_D Preamble Fields |
|---|---|
| Slot Session ID | Slot Session ID identifies the slots that transmit the same data package. Within the optical burst network, a slot session is used to transmit a data burst. The SSID would be the same as Burst ID. |
| Slot Session Length | Specifies the length of the slot session in number of slots. |
| Slot Sequence Number | It indicates the slot sequence number in the session. The initial sequence number is set as the total length of the session, then decrease to 1. At the receiving end, if SSN − 1 = 0, then no more slots are to come. |
| Slot Session Type | Indicates slot type for quality of service purposes. |
| Header Check Sum | A check sum used for SSSL headers. |

As in the embodiment shown above, the control channel 18 is responsible for transmitting BHPs and CPs. CP packets may include LCP (Link Control Protocol), IPCP (Internet Protocol Control Protocol), MPLSCP (Multi-Protocol Label Switching Control Protocol) and ICMPv4 (Internet protocol Control Message Protocol), and so on. The Control-channel Service Specific Slot Layer (SSSL_C) is defined based on this feature.

Figure 22:
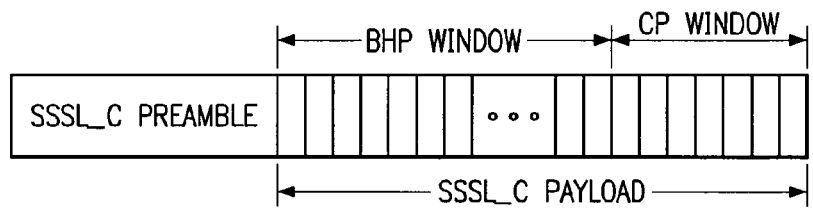
FIG. 22 illustrates a payload of a Service Specific Slot Layer for a control channel.

FIG. 22 illustrate a diagram of a SSSL_C format. As shown in FIG. 22, to transmit BHP and CPs, the SSSL_C payload is divided into micro-slots, and is partitioned into a CP window part and a BHP window part. The CP window part is allocated for transmitting network control information (CPs) and the BHP window part is used to transmit BHPs. In terms of packet processing, the difference is that for every BHP, the micro-slot contains a complete IPV4/PPP encapsulation (PPP stands for Point to Point Protocol). For CPs, under most cases a single CP can be transmitted over multiple micro-slots.

To facilitate transferring CPs and BHPs, the respective windows can change size if necessary for optimal transfer of the control information. It is assumed that a change in the partition between the CP and BHP windows would happen after or before a completion of a CP packet so that there in no change of the CP window size while a CP packet is in transmitting.

The CP window and BHP window size can also be statically set by management configuration functions. The CP window assumes to carry all network control information other than BHPs, including possible control messages in layer 2 like LCP (Link Control Protocol) messages for IPV4 (IPCP: Internet Protocol Control Protocol) and MPLS (MPLSCP: Multi-Protocol Label Switching Control Protocol).

Figure 23:
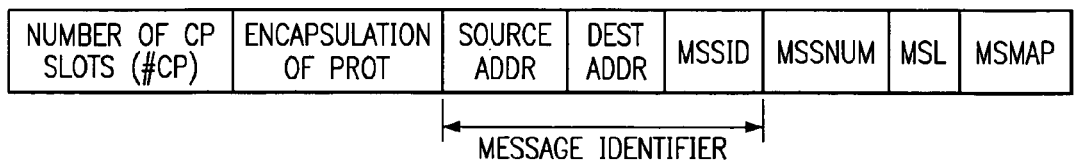
FIG. 23 illustrates a Service Specific Slot Layer preamble for a control channel.

The fields of the SSSL_C Preamble are shown in FIG. 23 and Table 4.

TABLE 4

SSSL_C Preamble Fields

| | |
|---|---|
| Number of CP micro-slots | Assuming that the CP window always start from 0 micro-slot, this field defines the number of micro-slots (#cp) that are used for transmitting CP messages. The CP window would be equal to #cp, the BHP window would be equal to number of micro slots minus #cp (#number of micro-slots − #cp). |
| Type of micro slots and protocol encapsulation | Specifies types micro slots, and possible encapsulation of protocols. It also needs to distinguish if IPV4/PPP/HDLC or IPV4/MPLS/PPP/HDLC encapsulation is used. |
| Source address, destination address and Micro-Slot Session ID (MSSID) | These fields are used to uniquely identify the CPs within the optical burst network. Source address and destination address are IPV4 addresses. MSSID is an integer managed by the source node. Micro-Slot Session ID identifies the slots that transmit the same CP between the source and destination. |
| Micro-slot Session Length (MSL) | Defines the length of CP in number of slots |
| Micro-slot Session Sequence NUMber (MSSNUM) | Indicates the micro-slot sequence number in the session. |
| Micro-slot Map (msmap) | Indicates which micro-slot is not used in the control slot. The number of bits in this field equals exactly the number of micro slots of a control slot. Value 1 represents used, 0 represents empty. |

Figure 24:
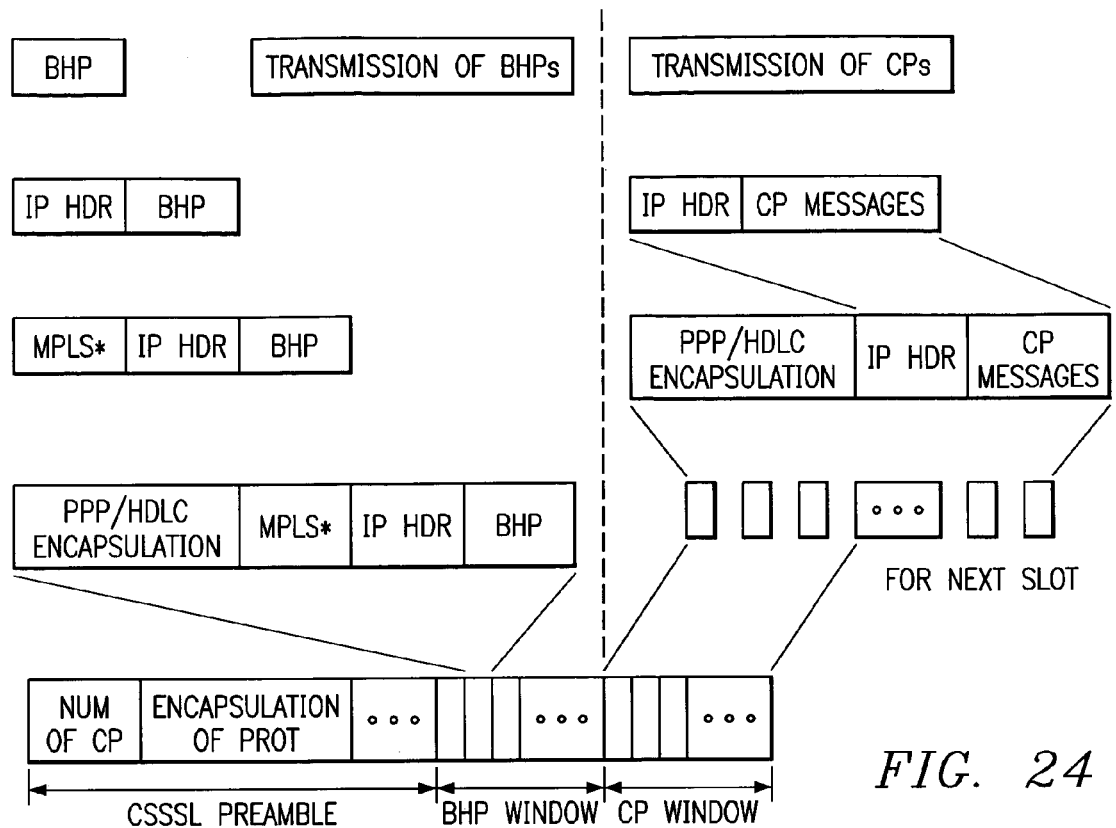
FIG. 24 illustrates the transmission of burst header packets and control packets.
Figure 25:
FIG. 25 illustrates a burst header.
Figure 26:
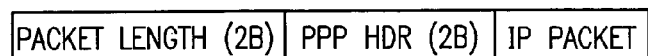
FIG. 26 illustrates a sub-packet of a burst.

The transmission of BHP and CP is shown as in FIG. 24. Depending on the size of the CP window (#cp), a CP packet will occupies $$\left\lceil \frac{\text{length\_of\_CP}}{\#\,cp \times (\text{CP\_payload\_length})} \right\rceil$$

slots in the control channel. A BHP will use one of the micro-slot in the BHP window of the slot. As shown in FIG. 24, each BHP and associated information is contained in a micro-slot with the BHP window; a CP and associated information may be split between CP windows of a sequence of slots.

Figure 27:
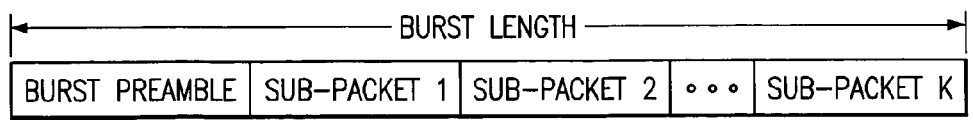
FIG. 27 illustrates format of a super packet.
Figure 28:
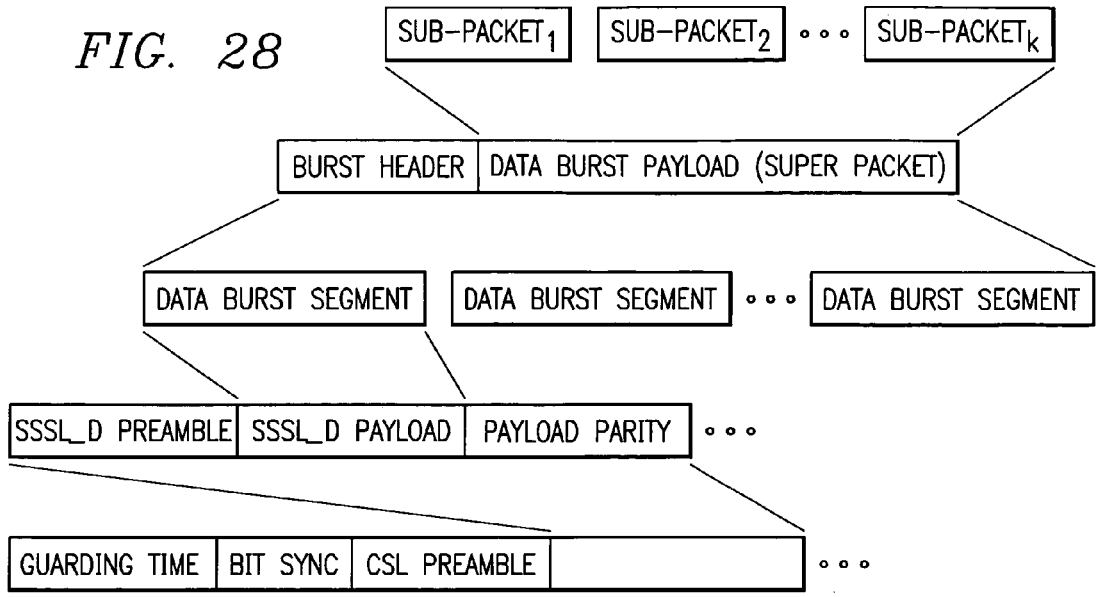
FIG. 28 illustrates transmission of a burst.

FIGS. 25 through 28 illustrate transmission of a burst 28. The overall structure is shown in FIG. 28. To transmit a data burst, a burst header (FIG. 25 and as described in Table 5) is first added to the burst 28. The entire burst is divided into segments. The segments then are attached to the SSSL preamble, and are transmitted by the slots.

TABLE 5

Burst Layer Fields

| | |
|---|---|
| Burst ID | Burst ID is a number. It should be unique per network edge. Burst ID is also present in BHP. When transmitting a data burst, the Slot Session ID (SSID) of SSSL will be set as the Burst ID. |
| Burst Type | Burst types may be distinguished for quality of service requirements at the network edge. |
| Burst length | It indicates burst length in bytes. Burst length = length of Burst Id field + length of Burst type field + length of Burst length filed + length of number of sub-packet filed + length of sub-packet 1 + . . . + length of sub-packet k |
| Number of sub-packets | It indicates the number of sub-packets |

FIG. 25 through FIG. 28 are related to processing of burst segmentation and assembly, error detection and flow control. A data burst is composed of many network layer packets. For the purpose of supporting multiple network protocols, PPP protocol is employed to support transportation of network packets over the data channel. For burst switching, it is preferable to not use bit stuffing, because this would require allocating space for the worst-case bit stuffing scenario, which could be awkward for variable length IP packets, especially since many of them may be cascaded together to form the super packet. Therefore, length indicator framing is chosen as a preferred method for layer 2 framer.

FIG. 27 show the organization of a super-packet. At an ingress router, incoming IP packets (or other data format) are received and a PPP header and packet length indicator are added to the packets to form a sub-packet, shown in FIG. 26. In FIG. 27, the super-packet is formed by accumulating all sub-packets associated with a burst and adding a burst preamble (shown in detail in FIG. 28).

Figure 29:
FIG. 29 illustrates the fields of a BHP micro-slot.
Figure 30:
FIG. 30 illustrates the fields of a BHP payload.
Figure 31:
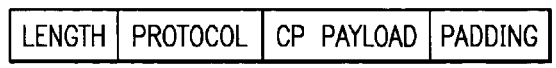
FIG. 31 illustrates the fields of a control packet.

BHP/CP encapsulation is shown in connection with FIG. 29 to FIG. 31. Both BHP and CPs are transmitted in the control slots that are treated as a PPP link. The encapsulation of BHP and CP are different, as described below.

As shown in FIG. 29, a BHP is a fixed length packet. It should always occupy one micro-slot of SSSL_C. Therefore no length indicator is necessary. The fields for a BHP are provided in Tables 6 and 7.

TABLE 6

BHP IPV4/MPLS/PPP Encapsulation

| | |
|---|---|
| Protocol Field (PPP header field) | This is a two octet field, and its value identifies the payload encapsulated in the Information field of the packet. The structure of this field should be consistent with the ISO 3309 extension mechanism for address fields. |
| MPLS Field | Contains the MPLS label as defined by IETF MPLS working group |
| IPV4 Header | It is a standard IPV4 header except that all the options will not be used. To support BHP, the PROTOCOL field of IPV4 header may be extended. |

The BHP Payload is shown in FIG. 30 and described in Table 7. All the BHPs will be transported in a micro-slot by using IP/MPLS/PPP encapsulation as shown in FIG. 29.

TABLE 7

BHP Payload

| | |
|---|---|
| Ingress Data Channel Group ID (IDCG) | Indicator of ingress data channel group |
| Ingress Data Channel (IDC) | Indicator of ingress data channel, it is within a data channel group |
| Burst ID (BID) | The burst ID is a sequence number that is unique per edge. The BID is present in both the BHP and data burst, can be used for correlation purposes. |
| Burst DURation (BDUR) | The number of slots before the corresponding burst would arrive. |
| Burst time offset (BOFFSET) | Indicates burst offset in terms of how many slots before the burst arrives the optical matrix |

FIG. 31 illustrates encapsulation of the control packets (CPs). Control packets may be of variable length. The length of a CP is indicated by the length field. The protocol field indicates the protocol type of the CP. The CP Payload carries the CP information. The padding field includes unused bits.

Figure 32:
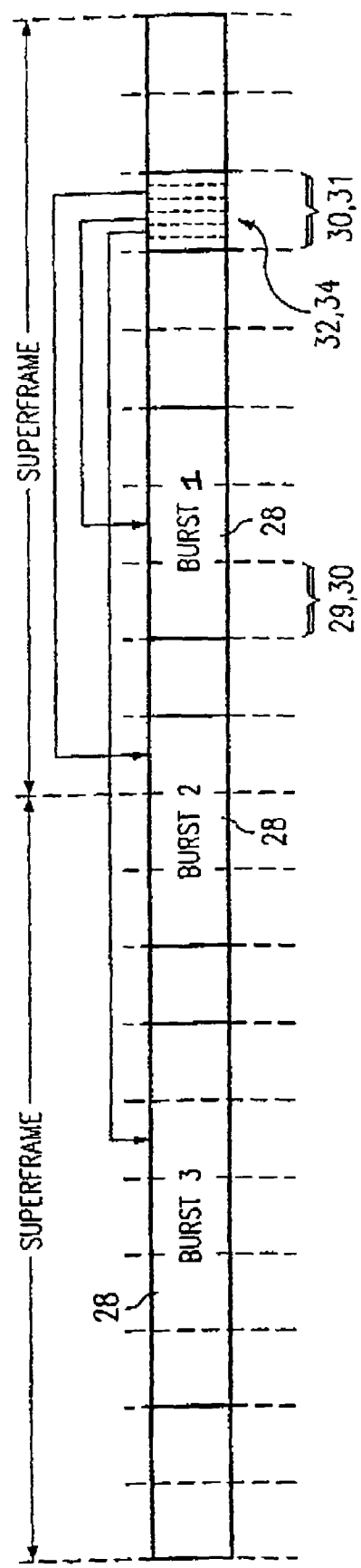
FIG. 32 illustrates in-band transmission of bursts and BHPs.

FIG. 32 illustrates a timing diagram showing in-band transmission of control and data bursts on a single channel.

An in-band implementation uses the same basic control/data structure as described above; however, slots 31 of BHPs 32 are transmitted on a common channel with the associated data bursts 28. In the illustrated embodiment, slots 30 are grouped into superframes. Control slots 31 and data slots 29 may be arbitrarily assigned within a superframe. Alternatively, the control slots 31 could be placed are regular positions within a superframe. Bursts 28 may span multiple superframes. Multiple control slots 31 may be present within a single superframe.

As above, a control slot 31 is divided into multiple microslots 34. Each microslot 34 may store a BHP 32 (or a control packet). Each BHP 32 is associated with a burst 28 on the same channel, so long as the timing relationship of the burst and its associated BHP is between $A_{min}$ and $A_{max}$.

One advantage of using in-band transmission of control and data is that the architecture is closer to a classic Internet protocol network, where the control header and data payload are transmitted together.

Figure 33:
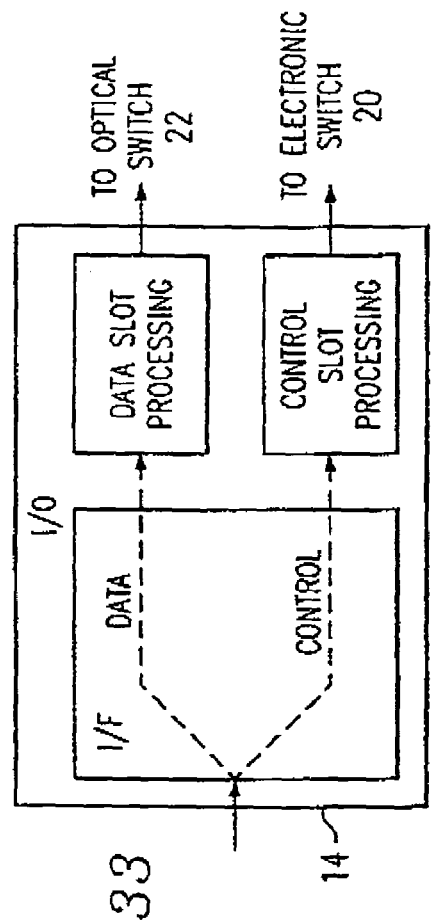
FIG. 33 illustrates a block diagram of an I/O circuit for in-band transmission.

FIG. 33 illustrates a I/O port 14 for use with in-band transmission. For each channel, I/O port 14 includes interface 150, data slot processor 152 and control slot processor 154. Interface 150 separates the data in control slots 31 from data slots 29. Identification of control slots 31 could be accomplished, for example, by a unique synchronization pattern. When a control slot is identified, the data is transferred to the control slot processor 154 for preparing the data for transmission to the electronic control circuit 20. Similarly, data slots 29 are sent to data slot processor 152 for preparation for entering the optical switch 22.

Importantly, the protocol described above can be used for either in-band or out-band transmission modes.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of scheduling the switching of data bursts through a router in an optical burst switched network, wherein data bursts are received by the router over a first set of optical transmission lines and are switched to a second set of optical transmission lines, wherein the data bursts are communicated over said first and second sets of optical transmission lines over multiple channels using synchronous fixed length slots, each burst occupying one or more slots in a channel, comprising the steps of:
   generating current scheduling bit patterns for respective outgoing channels indicating which slots in each outgoing channel are already scheduled to transmit a data burst within a predetermined time window relative to a current time point;
   generating an incoming burst bit sequence for an incoming burst indicating which slots within said predetermined time window would be occupied by said incoming burst relative to a current time point; and
   comparing said incoming burst bit sequence with said current scheduling bit patterns to determine whether said incoming burst can be scheduled for transmission on one of said outgoing channels.

2. The method of claim 1 wherein said router further includes one or more delay lines, each delay line having an associated delay of one or more slot periods, and further comprising the steps of:
   for each unique delay provided by the delay lines, generating a delayed incoming burst bit sequence indicating which slots would be occupied by said incoming burst if said incoming burst were delayed by said unique delay; and
   comparing said delayed incoming burst bit sequences with said current scheduling bit patterns to determine whether said incoming burst can be scheduled for transmission on one of said outgoing channels after at least one of said delays.

3. The method of claim 2 and further comprising the step of generating delay line scheduling bit sequences for respective delay lines indicating which slots in each delay line are already scheduled to transmit a data burst within a predetermined delay time window relative to a current time.

4. The method of claim 3 and further comprising the step of comparing said incoming burst bit sequence with said delay line scheduling bit sequences to determine whether said incoming burst can be scheduled for transmission on one of said delay lines.

5. The method of claim 1 wherein each data burst is preceded by an associated control header indicating the time of arrival and length of its associated data burst and further comprising the step of generating a control header scheduling bit pattern for indicating whether a control slot associated with one or more of said outgoing channels is fully occupied.

6. The method of claim 5 wherein control headers associated with multiple bursts can occupy one control slot.

7. The method of claim 1 wherein said router further includes one or more delay lines, each delay line having an associated delay of one or more slot periods, and wherein each data burst is preceded by an associated control header indicating the time of arrival and length of its associated data burst, and further comprising the steps of:
   generating a control header scheduling bit pattern for indicating whether a control slot associated with one or more of said outgoing channels is fully occupied;
   generating delay line scheduling bit sequences for respective delay lines indicating which slots in each delay line are already scheduled to transmit a data burst within a predetermined delay time window relative to a current time;
   for each unique delay provided by the delay lines, generating a delayed incoming burst bit sequence indicating which slots would be occupied by said incoming burst if said incoming burst were delayed by said unique delay;
   comparing said delayed incoming burst bit sequences with said current scheduling bit patterns to determine whether said incoming burst can be scheduled for transmission on one of said outgoing channels after at least one of said unique delays;
   comparing said incoming burst bit sequence with said delay line scheduling bit sequences to determine whether said incoming burst can be scheduled for transmission on one of said delay lines; and
   determining from said control header scheduling bit pattern whether a control header bit associated with the incoming data burst can be scheduled between a minimum and maximum offset.

8. The method of claim 7 wherein said comparing steps and said determining step are performed in parallel.

9. An optical burst switched network including one or more interconnected routers, one or more of said routers comprising:
   an optical matrix coupled between a first set of optical transmission lines and a second set of optical transmission lines, wherein the data bursts are communicated over said first and second sets of optical transmission lines over multiple channels using synchronous fixed length slots, each burst occupying one or more slots in a channel;

scheduling circuitry for scheduling the switching of data bursts through the optical matrix, comprising:

circuitry for generating current scheduling bit patterns for respective outgoing channels indicating which slots in each outgoing channel are already scheduled to transmit a data burst within a predetermined time window relative to a current time point;

circuitry for generating an incoming burst bit sequence for an incoming burst indicating which slots within said predetermined time window would be occupied by said incoming burst relative to a current time point; and circuitry for comparing said incoming burst bit sequence with said current scheduling bit patterns to determine whether said incoming burst can be scheduled for transmission on one of said outgoing channels.

10. The network of claim 9 wherein each router further includes one or more delay lines, each delay line having an associated delay of one or more slot periods, and wherein said scheduling circuitry further comprises:

circuitry for generating a delayed incoming burst bit sequence for each unique delay provided by the delay lines, indicating which slots would be occupied by said incoming burst if said incoming burst were delayed by said unique delay; and circuitry for comparing said delayed incoming burst bit sequences with said current scheduling bit patterns to determine whether said incoming burst can be scheduled for transmission on one of said outgoing channels after at least one of said delays.

11. The network of claim 10 and wherein said scheduling circuitry further comprises circuitry for generating delay line scheduling bit sequences for respective delay lines indicating which slots in each delay line are already scheduled to transmit a data burst within a predetermined delay time window relative to a current time.

12. The network of claim 11 wherein said scheduling circuitry further comprises circuitry for comparing said incoming burst bit sequence with said delay line scheduling bit sequences to determine whether said incoming burst can be scheduled for transmission on one of said delay lines.

13. The network of claim 9 wherein each data burst is preceded by an associated control header indicating the time of arrival and length of its associated data burst and wherein said scheduling circuitry further comprises circuitry for generating a control header scheduling bit pattern for indicating whether a control slot associated with one or more of said outgoing channels is fully occupied.

14. The network of claim 13 wherein control headers associated with multiple bursts can occupy one control slot.

15. The network of claim 9 wherein said router further includes one or more delay lines, each delay line having an associated delay of one or more slot periods, and wherein each data burst is preceded by an associated control header indicating the time of arrival and length of its associated data burst, and wherein said scheduling circuitry further comprises:

circuitry for generating a control header scheduling bit pattern for indicating whether a control slot associated with one or more of said outgoing channels is fully occupied;

circuitry for generating delay line scheduling bit sequences for respective delay lines indicating which slots in each delay line are already scheduled to transmit a data burst within a predetermined delay time window relative to a current time;

circuitry for generating a delayed incoming burst bit sequence for each unique delay provided by the delay lines, indicating which slots would be occupied by said incoming burst if said incoming burst were delayed by said unique delay;

circuitry for comparing said delayed incoming burst bit sequences with said current scheduling bit patterns to determine whether said incoming burst can be scheduled for transmission on one of said outgoing channels after at least one of said unique delays;

circuitry for comparing said incoming burst bit sequence with said delay line scheduling bit sequences to determine whether said incoming burst can be scheduled for transmission on one of said delay lines; and circuitry for determining from said control header scheduling bit pattern whether a control header bit associated with the incoming data burst can be scheduled between a minimum and maximum offset.

16. The network of claim 15 wherein said comparing circuitry compares said incoming burst bit sequence with said delay line scheduling bit sequences to determine whether said incoming burst can be scheduled for transmission on one of said delay lines in parallel with said determining circuitry determining from said control header scheduling bit pattern whether a control header bit associated with the incoming data burst can be scheduled between a minimum and maximum offset.

17. An optical router for routing data bursts, comprising:

an optical matrix coupled between a first set of optical transmission lines and a second set of optical transmission lines, wherein the data bursts are communicated over said first and second sets of optical transmission lines over multiple channels using synchronous fixed length slots, each burst occupying one or more slots in a channel;

scheduling circuitry for scheduling the switching of data bursts through the optical matrix, comprising:

circuitry for generating current scheduling bit patterns for respective outgoing channels indicating which slots in each outgoing channel are already scheduled to transmit a data burst within a predetermined time window relative to a current time point;

circuitry for generating an incoming burst bit sequence for an incoming burst indicating which slots within said predetermined time window would be occupied by said incoming burst relative to a current time point; and circuitry for comparing said incoming burst bit sequence with said current scheduling bit patterns to determine whether said incoming burst can be scheduled for transmission on one of said outgoing channels.

18. The router of claim 17 wherein each router further includes one or more delay lines, each delay line having an associated delay of one or more slot periods, and wherein said scheduling circuitry further comprises:

circuitry for generating a delayed incoming burst bit sequence for each unique delay provided by the delay lines, indicating which slots would be occupied by said incoming burst if said incoming burst were delayed by said unique delay; and circuitry for comparing said delayed incoming burst bit sequences with said current scheduling bit patterns to determine whether said incoming burst can be scheduled for transmission on one of said outgoing channels after at least one of said delays.

19. The router of claim 18 and wherein said scheduling circuitry further comprises circuitry for generating delay line scheduling bit sequences for respective delay lines indicating which slots in each delay line are already scheduled to transmit a data burst within a predetermined delay time window relative to a current time.

20. The router of claim 19 wherein said scheduling circuitry further comprises circuitry for comparing said incoming burst bit sequence with said delay line scheduling bit sequences to determine whether said incoming burst can be scheduled for transmission on one of said delay lines.

21. The router of claim 17 wherein each data burst is preceded by an associated control header indicating the time of arrival and length of its associated data burst and wherein said scheduling circuitry further comprises circuitry for generating a control header scheduling bit pattern for indicating whether a control slot associated with one or more of said outgoing channels is fully occupied.

22. The router of claim 21 wherein control headers associated with multiple bursts can occupy one control slot.

23. The router of claim 17 wherein said router further includes one or more delay lines, each delay line having an associated delay of one or more slot periods, and wherein each data burst is preceded by an associated control header indicating the time of arrival and length of its associated data burst, and wherein said scheduling circuitry further comprises:

circuitry for generating a control header scheduling bit pattern for indicating whether a control slot associated with one or more of said outgoing channels is fully occupied;

circuitry for generating delay line scheduling bit sequences for respective delay lines indicating which slots in each delay line are already scheduled to transmit a data burst within a predetermined delay time window relative to a current time;

circuitry for generating a delayed incoming burst bit sequence for each unique delay provided by the delay lines, indicating which slots would be occupied by said incoming burst if said incoming burst were delayed by said unique delay;

circuitry for comparing said delayed incoming burst bit sequences with said current scheduling bit patterns to determine whether said incoming burst can be scheduled for transmission on one of said outgoing channels after at least one of said unique delays;

circuitry for comparing said incoming burst bit sequence with said delay line scheduling bit sequences to determine whether said incoming burst can be scheduled for transmission on one of said delay lines; and circuitry for determining from said control header scheduling bit pattern whether a control header bit associated with the incoming data burst can be scheduled between a minimum and maximum offset.

24. The router of claim 23 wherein said comparing circuitry compares said incoming burst bit sequence with said delay line scheduling bit sequences to determine whether said incoming burst can be scheduled for transmission on one of said delay lines simultaneously with said determining circuitry determining from said control header scheduling bit pattern whether a control header bit associated with the incoming data burst can be scheduled between a minimum and maximum offset.

* * * * *